United States Patent
Olsson et al.

(10) Patent No.: US 11,864,247 B2
(45) Date of Patent: Jan. 2, 2024

(54) DATA NETWORK NAME (DNN) MANIPULATION

(71) Applicant: Telefonaktiebolaget LM Ericsson (publ), Stockholm (SE)

(72) Inventors: Lasse Olsson, Träslövsläge (SE); Peter Ramle, Mölnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 180 days.

(21) Appl. No.: 17/601,018

(22) PCT Filed: Dec. 6, 2019

(86) PCT No.: PCT/EP2019/084026
§ 371 (c)(1),
(2) Date: Oct. 1, 2021

(87) PCT Pub. No.: WO2020/200501
PCT Pub. Date: Oct. 8, 2020

(65) Prior Publication Data
US 2022/0158973 A1    May 19, 2022

Related U.S. Application Data

(60) Provisional application No. 62/829,934, filed on Apr. 5, 2019.

(51) Int. Cl.
*H04W 76/10* (2018.01)
*H04L 61/301* (2022.01)
*H04W 48/18* (2009.01)
*H04L 101/654* (2022.01)
*H04L 101/375* (2022.01)

(52) U.S. Cl.
CPC .......... *H04W 76/10* (2018.02); *H04L 61/301* (2013.01); *H04W 48/18* (2013.01); *H04L 2101/375* (2022.05); *H04L 2101/654* (2022.05)

(58) Field of Classification Search
CPC .... H04W 76/10; H04W 48/18; H04L 61/301; H04L 2101/654; H04L 2101/375
See application file for complete search history.

(56) References Cited

U.S. PATENT DOCUMENTS

2018/0103368 A1*  4/2018  Son .................. H04W 36/0022
2019/0053308 A1   2/2019  Castellanos Zamora et al.

OTHER PUBLICATIONS

Nokia et al.: "CN handling of unsupported DNN", Mar. 1, 2019 (Mar. 1, 2019), pp. 1-2, XP055668522, Retrieved from the Internet: URL: https://www.3gpp.org/ftp/tsg_sa/WG2_Ar ch/TSGS2_131_Tenerife/Docs/S2-1902114.zip [retrieved on 2020-02013].*

(Continued)

*Primary Examiner* — Brenda H Pham
(74) *Attorney, Agent, or Firm* — Sage Patent Group

(57) ABSTRACT

A method of operating a core access and mobility management function (AMF) node configured to operate in a communications network includes receiving a protocol data unit (PDU) session request from user equipment (UE). The PDU session request includes a requested data network name (DNN). The method also includes determining if a trigger has been activated. The method further includes receiving a manipulated DNN or replacement DNN for the requested DNN in response to the trigger being activated.

18 Claims, 22 Drawing Sheets

(56) References Cited

OTHER PUBLICATIONS

International Search Report and Written Opinion of the International Searching Authority, PCT/EP2019/084026, dated Feb. 21, 2020, 10 pages.

Nokia et al., 3GPP TSG SA WG2#131, S2-1902114, "CN handling of unsupported DNN," Santa Cruz, Tenerife, Spain, Feb. 25-Mar. 1, 2019, 2 pages.

Nokia et al., 3GPP TSG-SA WG2 Meeting #131, S2-1902115, "5GC handling of unsupported CNN," Santa Cruz, Tenerife, Spain, Feb. 25-Mar. 1, 2019, 5 pages.

Nokia et al., 3GPP TSG-SA WG2 Meeting #126, S2-182371, "MME handling of unsupported APN," Montreal, Canada, Feb. 26-Mar. 2, 2018, 27 pages.

Ericsson et al., 3GPP TSG SA WG2 Meeting #133, S2-1905044, "DNN replacement in 5GC," Reno, Nevada, United States, May 13-17, 2019, 3 pages.

Nokia et al., 3GPP TSG SA WG2 Meeting #131, S2-1902116 "5GC handling of unsupported DNN requested by a UE," Santa Cruz, Tenerife, Spain, Feb. 25-Mar. 1, 2019, 3 pages.

Ericsson, "APN Resolve and Redirect for LTE Access, Technical Product Description," 62/221 02-AXB 250 05/8 Uen M, May 15, 2017, 23 pages.

\* cited by examiner

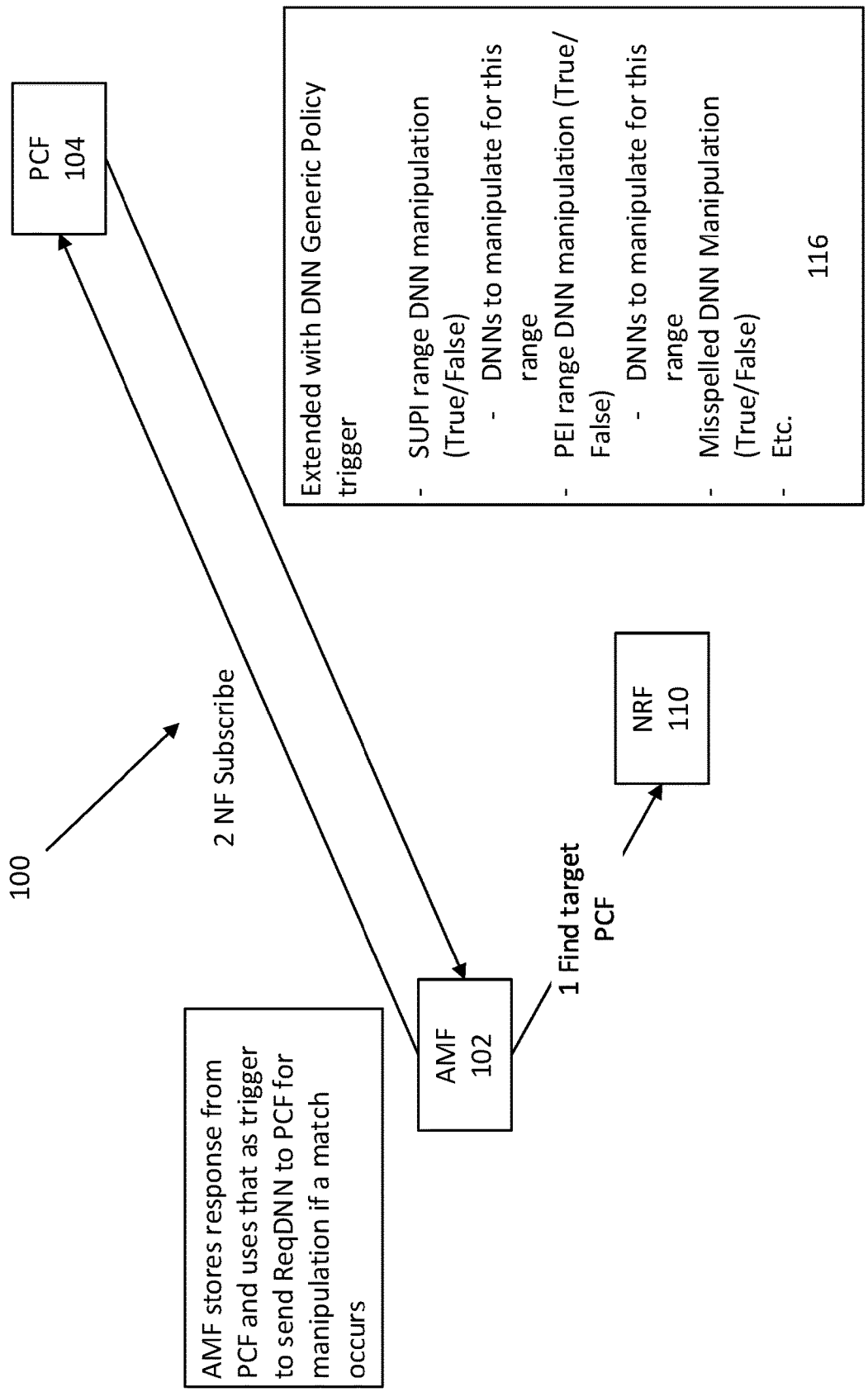

Wireless Device UE Operations

Core Access and Mobility Management Function (AMF) Node Operations

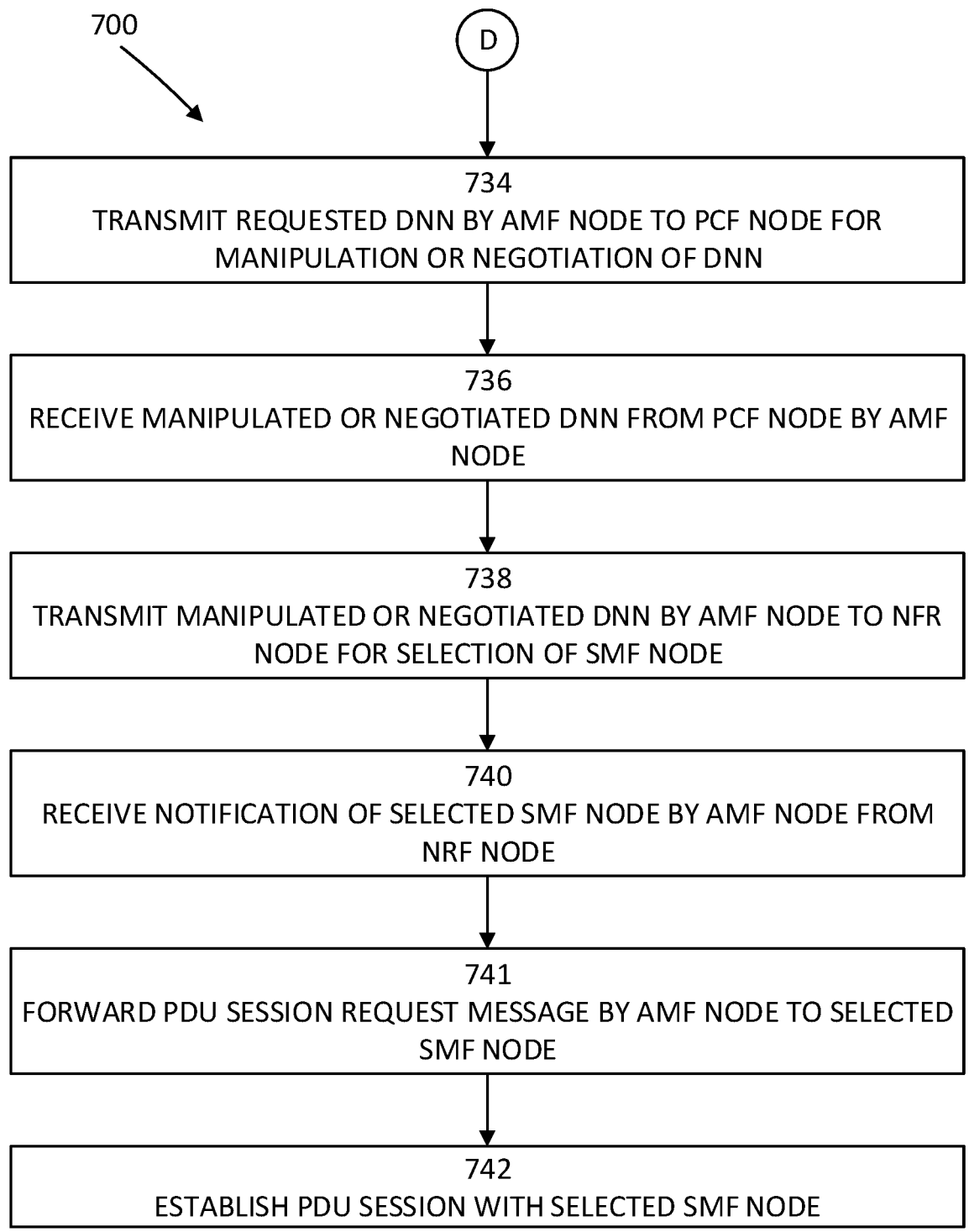

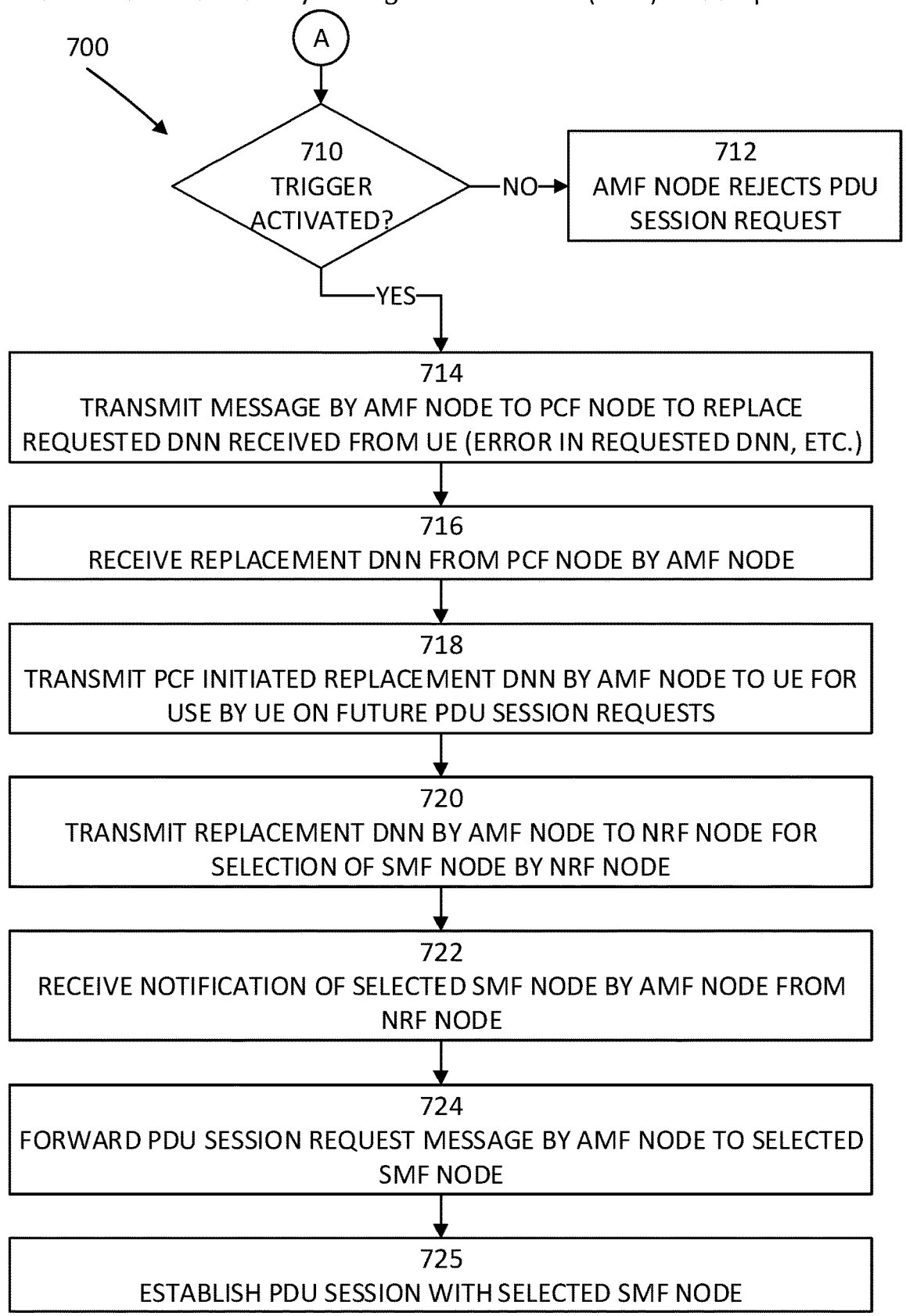

Core Access and Mobility Management Function (AMF) Node Operations

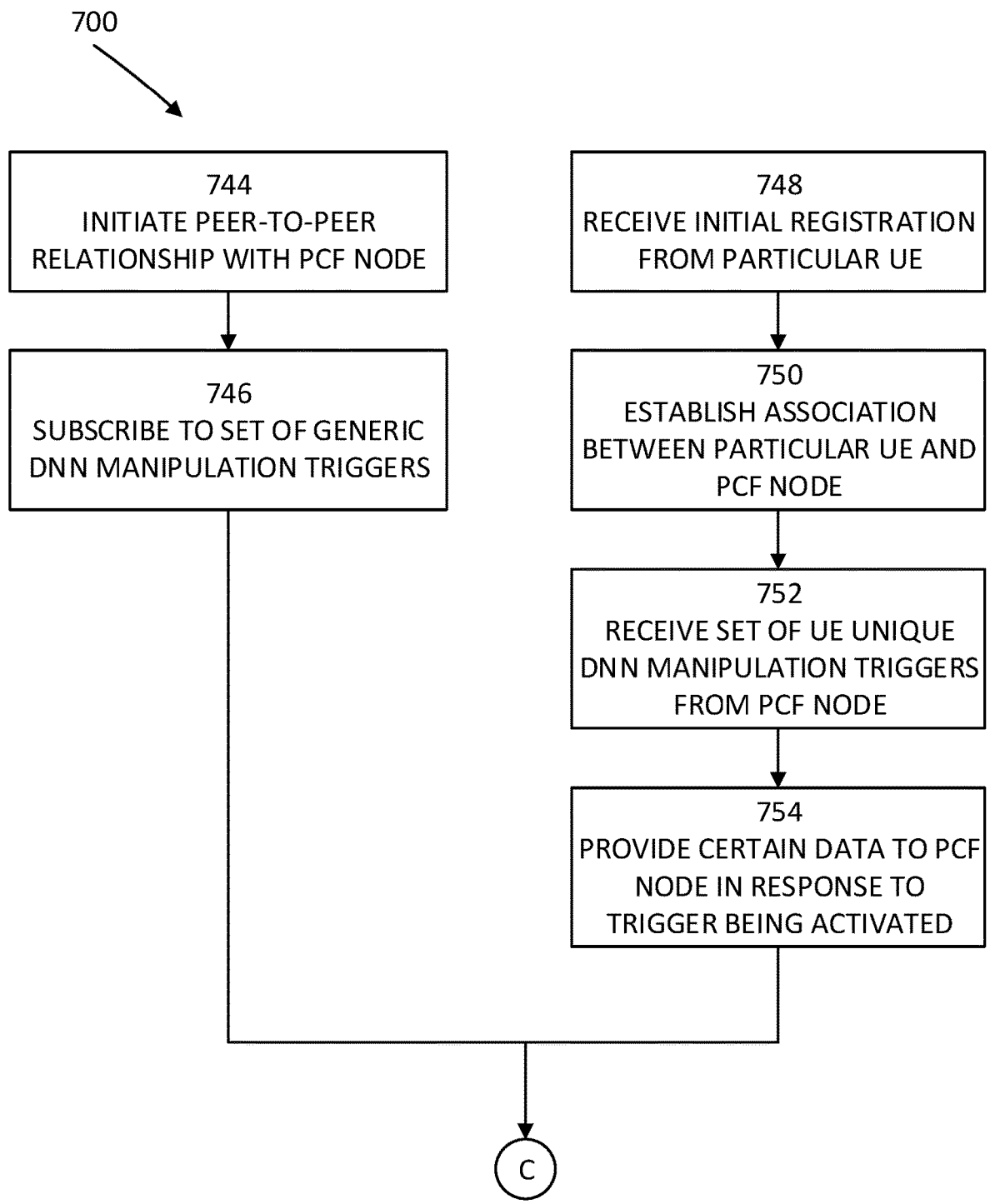

Policy Control Function (PCF) Node Operations

Policy Control Function (PCF) Node Operations

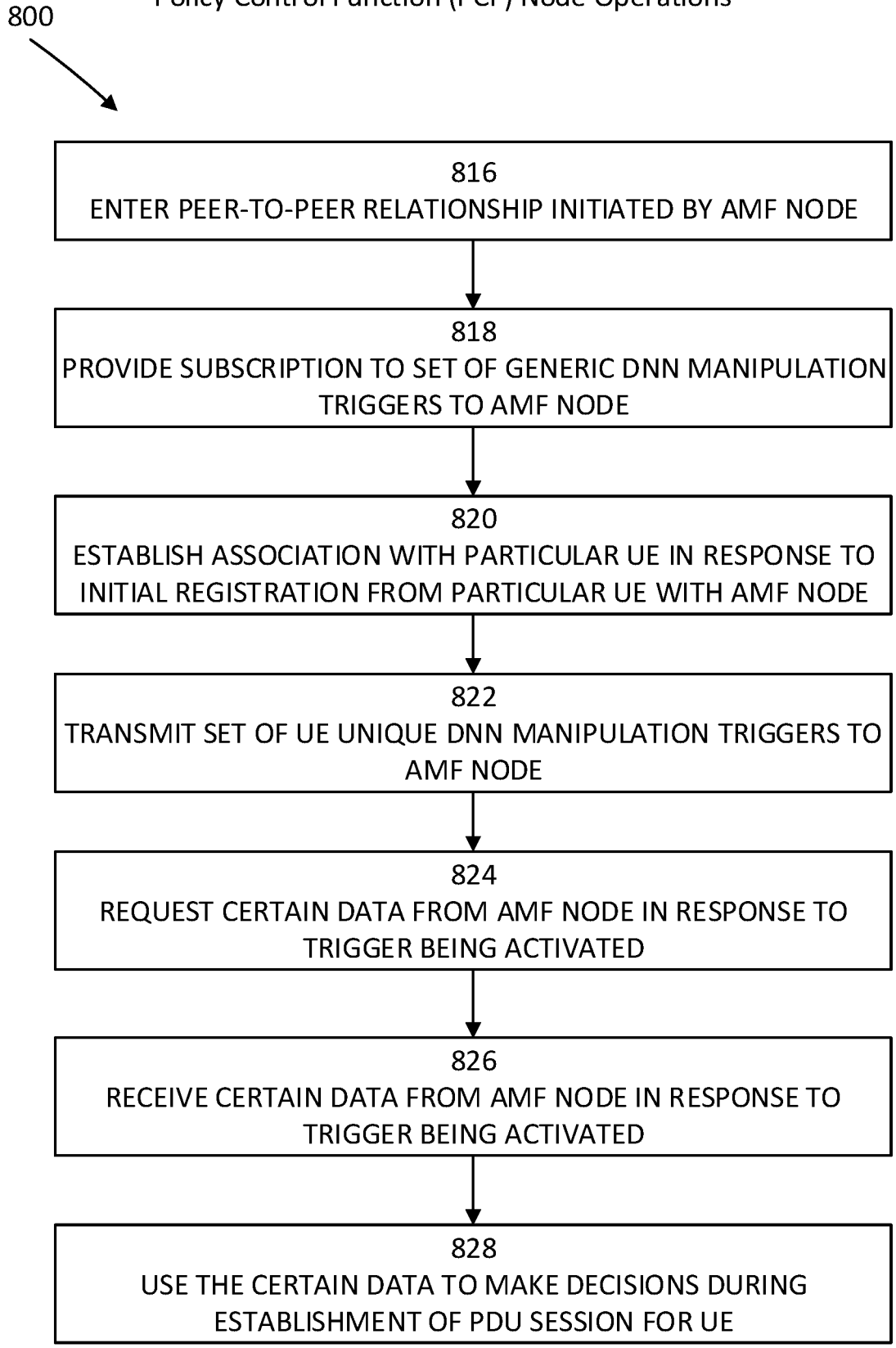

DATA NETWORK NAME (DNN) MANIPULATION

CROSS REFERENCE TO RELATED APPLICATIONS

This application is a 35 U.S.C. § 371 national stage application of PCT International Application No. PCT/EP2019/084026 filed on Dec. 6, 2019, which in turn claims the benefit of U.S. Provisional Application No. 62/829,934, filed Apr. 5, 2019, the disclosures and content of which are incorporated by reference herein in their entirety.

TECHNICAL FIELD

The present disclosure relates generally to communications, and more particularly to communication methods and related devices and nodes supporting wireless communications.

BACKGROUND

In the fourth generation (4G) of cellular network technology, there were features that could to some degree correct either a misspelled access point name (APN) or extend the APN, both to find a correct gateway, e.g., dedicated traffic for certain user equipment and also provide a new "negotiated" APN to the public data network gateway (PGW) for routing purposes. This logic was placed in the mobility management entity (MME) and relied on manual configuration in each network element (NE). In 5G, there is a need to determine how to handle data network names (DNNs) that are misspelled, non-supported, etc. and/or adding extensions to the DNN or manipulating the DNN.

SUMMARY

In accordance with an embodiment, a method of operating a core access and mobility management function (AMF) node configured to operate in a communications network (960) includes receiving a protocol data unit (PDU) session request from user equipment (UE). The PDU session request includes a requested data network name (DNN). The method also includes determining if a trigger has been activated. The method additionally includes receiving a manipulated DNN or replacement DNN for the requested DNN in response to the trigger being activated.

In accordance with another embodiment, a method of operating a policy control function (PCF) node configured to operate in a communications network includes receiving a message from an AMF node in response to activation of a trigger. The message includes a requested DNN and optionally other relevant information e.g. UE location, UE network capability. The requested DNN is includes in a PDU session request received by the AMF node from a UE. The method additionally includes performing a manipulation or replacing the requested DNN with a manipulated DNN or a replacement DNN. The method further includes transmitting the manipulated DNN or the replacement DNN to the AMF node.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 1B is a diagram of the wireless communications network including nodes and logic for a network function (NF) or node centric trigger according to some embodiments of inventive concepts.

FIGS. 7A-7E are a flow chart illustrating operations of a core access and mobility management function (AMF) node according to some embodiments of inventive concepts.

FIGS. 8A-8C are flow charts illustrating operations of a core policy control function (PCF) node according to some embodiments of inventive concepts.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1A:
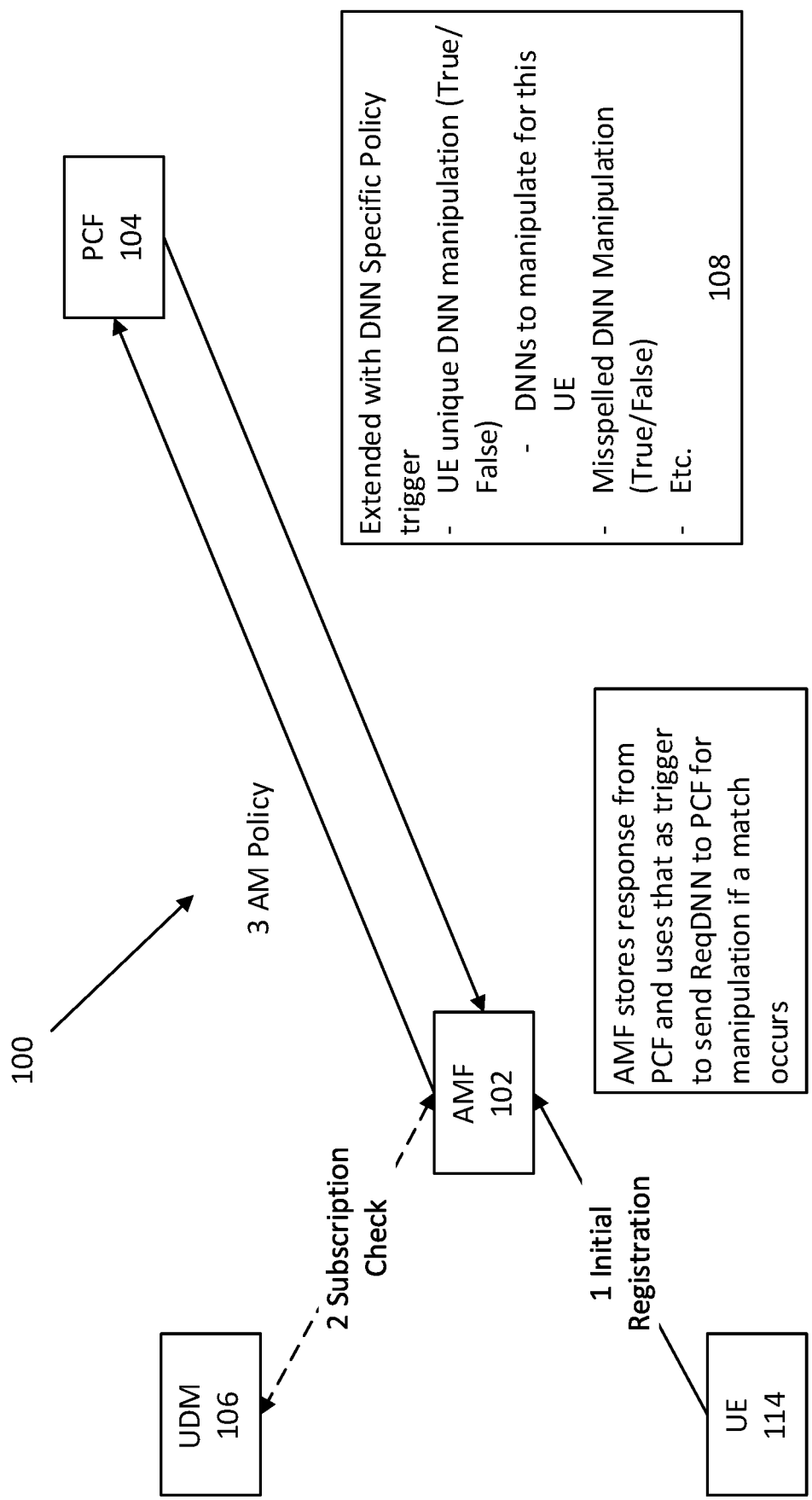
FIG. 1A is a diagram of a wireless communications network including nodes and logic for a user equipment centric trigger according to some embodiments of inventive concepts.
Figure 2:
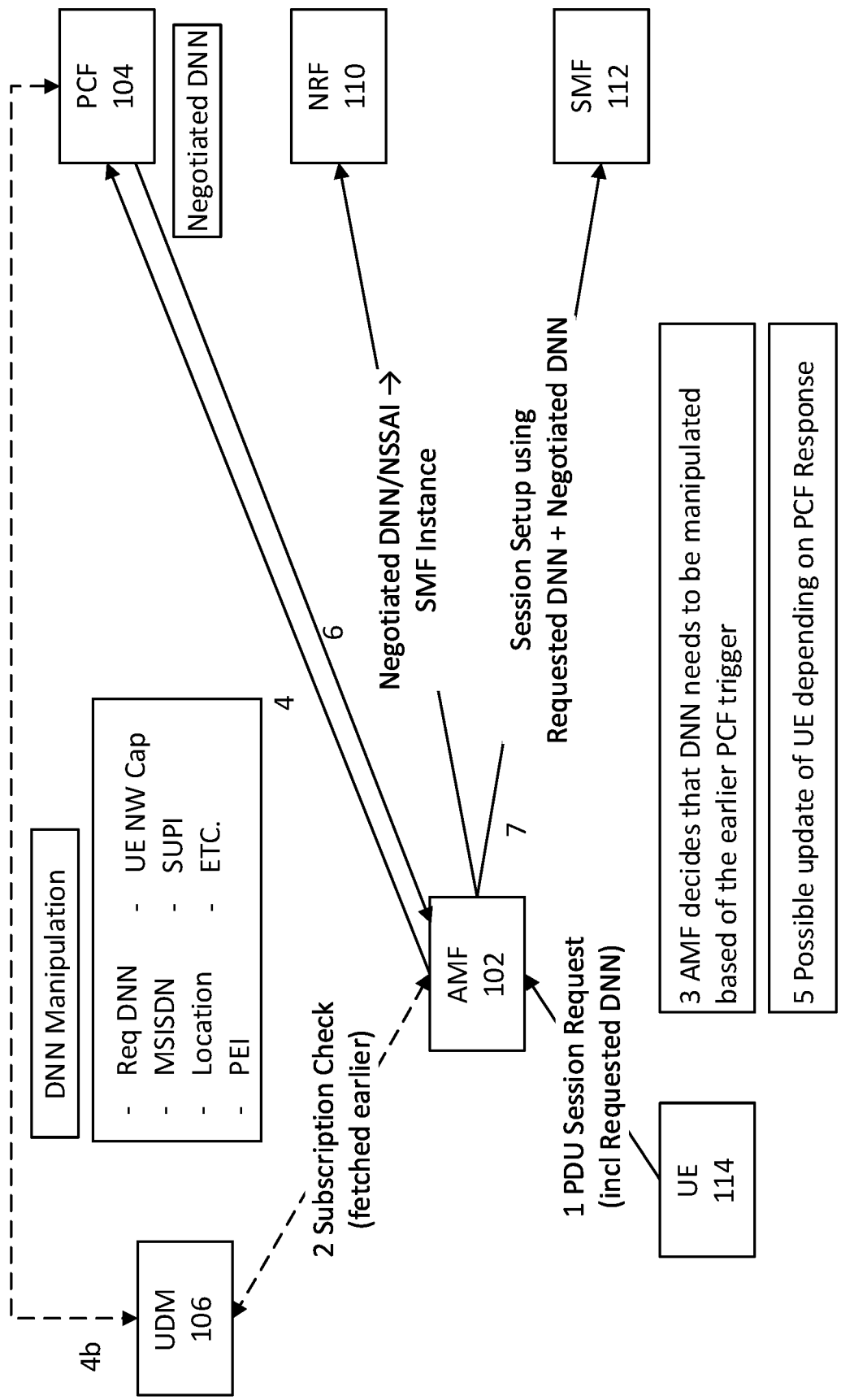
FIG. 2 is a diagram of the wireless communications network illustrating actions in response to a trigger being activated according to some embodiments of inventive concepts.

FIG. 1A is a diagram of a wireless communications network 100 including nodes 102-106 and logic 108 for a user equipment (UE) centric trigger according to some embodiments of inventive concepts. The wireless communications network 100 includes a core access and mobility management function (AMF) node 102, a core policy control function (PCF) node 104 and a unified data management (UDM) node 106. As shown in FIG. 2, the wireless communications network 100 also includes a network repository function (NRF) node 110 and a session management function (SMF) node 112. These nodes are part of the 3GPP 5G (3rd Generation Partnership Project) architecture. Functions of the AMF node 102 include but are not necessarily limited to registration management, connection management, reachability management, mobility management and various functions related to security and access management and authorization. Functions of the PCF node 104 include but are not necessarily limited to supporting a unified policy framework that governs network behavior. In so doing, the PCF node 104 provides policy rules for control and user plane functions that enforce them. This includes network slicing, roaming, mobility management, quality of service (QoS) policy, charging control functions, etc.

Functions of the UDM node 106 include but are not necessarily limited to Subscription management and supporting ARPF (Authentication Credential Repository and Processing Function) and stores the long-term security credentials used in authentication for AKA (Authentication and Key Agreement). AKA is a mechanism for performing authentication and session key distribution in UMTS, IMS and LTE networks. Functions of the NRF node 110 include but are not necessarily limited to supporting the service discovery function, e.g., selection of an SMF node 112. Functions of the SMF node 112 include but are not necessarily limited to functions relating to subscriber sessions, e.g., session establishment, modify and release.

UE centric triggers are also referred to herein as a set of UE unique manipulation triggers. The set of UE unique manipulation triggers are based on one more characteristics of a particular UE. Examples of the one or more UE characteristics include but are not necessarily limited to the MSISDN of the particular UE, the geographic location of the particular UE, and a requested data network name (DNN) included in a PDU session request (1 in FIG. 2) from a particular UE 114. A trigger is activated in response to one of the UE characteristics matching a preset value.

As described in more detail with reference to FIGS. 7C and 8C, the AMF node 102 receives an initial registration from the UE 114. The AMF node 102 checks the authorization of the UE 114 by comparing the requested DNN to subscription information stored by the UDM node 106. An association between the UE 114 and the PCF node 104 is established. The AMF node 102 receives a set of UE unique DNN manipulation triggers from the PCF node 104. The AMF node 102 stores the set of UE unique DNN manipulation triggers and determines whether any of the triggers are activated in response to a PDU session request including a requested DNN as illustrated in FIG. 2.

FIG. 1B is a diagram of the wireless communications network 100 including nodes 102-110 and logic 116 for a network function (NF) or node centric trigger according to some embodiments of inventive concepts. The NF or node centric triggers are also referred to herein as a set generic DNN manipulation triggers. Examples of a set of generic DNN manipulation triggers include but are not necessarily limited to parts of a permanent equipment identifier (PEI) identifying a specific range of UE and/or a subscriber permanent identifier (SUPI) range. A trigger is activated in response to at least one of the PEI parts being within the specific range of UE or the SUPI being within the SUPI range.

FIG. 2 is a diagram of the wireless communications network 100 illustrating actions in response to a trigger being activated according to some embodiments of inventive concepts. The actions are described with reference to FIGS. 7A-7E below.

Figure 3:
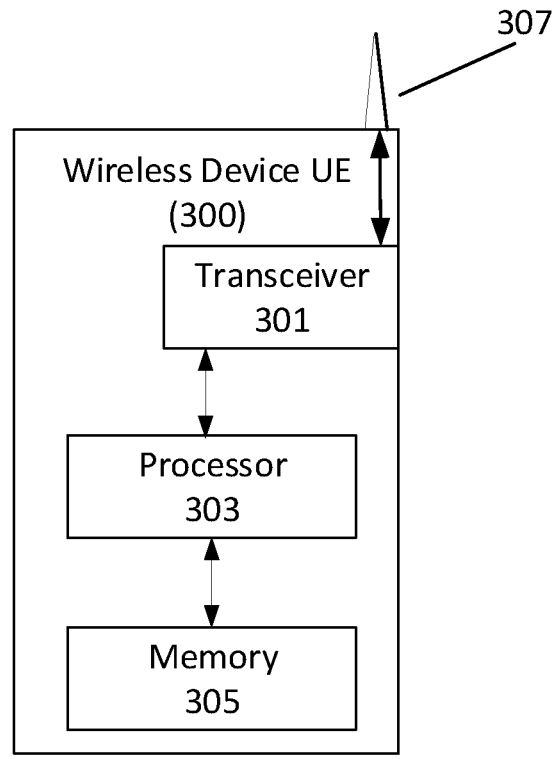
FIG. 3 is a block diagram illustrating a wireless device or user equipment (UE) according to some embodiments of inventive concepts.

FIG. 3 is a block diagram illustrating elements of a wireless device or UE 300 (also referred to as a mobile terminal, a mobile communication terminal, a wireless communication device, a wireless terminal, mobile device, a wireless communication terminal, user equipment, UE, a user equipment node/terminal/device, etc.) configured to provide wireless communication according to embodiments of inventive concepts. In accordance with an exemplary embodiment, the UE 300 is used for the UE 114 in FIGS. 1A, 1B and 2. (Wireless device 300 may be provided, for example, as discussed below with respect to wireless device 910 of FIG. 9.) As shown, wireless device UE may include an antenna 307 (e.g., corresponding to antenna 911 of FIG. 9), and transceiver circuitry 301 (also referred to as a transceiver, e.g., corresponding to interface 914 of FIG. 9) including a transmitter and a receiver configured to provide uplink and downlink radio communications with a base station(s) (e.g., corresponding to network node 960 of FIG. 9, also referred to as a RAN node) of a radio access network. Wireless device UE may also include processing circuitry 303 (also referred to as a processor, e.g., corresponding to processing circuitry 920 of FIG. 9) coupled to the transceiver circuitry, and memory circuitry 305 (also referred to as memory, e.g., corresponding to device readable medium 930 of FIG. 9) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. Wireless device UE may also include an interface (such as a user interface) coupled with processing circuitry 303, and/or wireless device UE may be incorporated in a vehicle.

As discussed herein, operations of wireless device UE may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Moreover, modules may be stored in memory circuitry 305, and these modules may provide instructions so that when instructions of a module are executed by processing circuitry 303, processing circuitry 303 performs respective operations (e.g., operations discussed below with respect to Example Embodiments relating to wireless devices).

Figure 4:
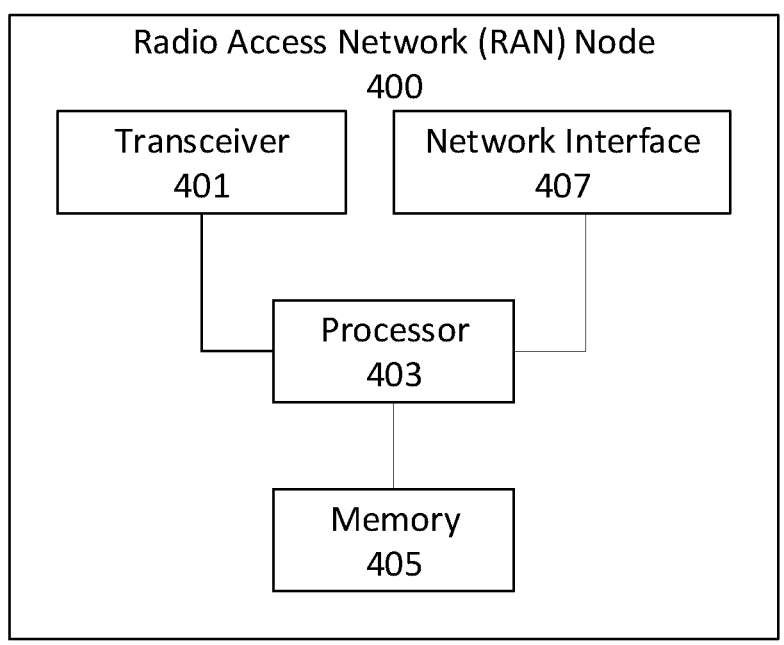
FIG. 4 is a block diagram illustrating a radio access network RAN node (e.g., a base station eNB/gNB) according to some embodiments of inventive concepts.

FIG. 4 is a block diagram illustrating elements of a radio access network RAN node 400 (also referred to as a network node, base station, eNodeB/eNB, gNodeB/gNB, etc.) of a Radio Access Network (RAN) configured to provide cellular communication according to embodiments of inventive concepts. (RAN node 400 may be provided, for example, as discussed below with respect to network node 960 of FIG. 9.) As shown, the RAN node may include transceiver circuitry 401 (also referred to as a transceiver, e.g., corresponding to portions of interface 990 of FIG. 9) including a transmitter and a receiver configured to provide uplink and downlink radio communications with mobile terminals. The RAN node may include network interface circuitry 407 (also referred to as a network interface, e.g., corresponding to portions of interface 990 of FIG. 9) configured to provide communications with other nodes (e.g., with other base stations) of the RAN and/or core network CN. The network node may also include processing circuitry 403 (also referred to as a processor, e.g., corresponding to processing circuitry 970) coupled to the transceiver circuitry, and memory circuitry 405 (also referred to as memory, e.g., corresponding to device readable medium 980 of FIG. 9) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the RAN node may be performed by processing circuitry 403, network interface 407, and/or transceiver 401. For example, processing circuitry 403 may control transceiver 401 to transmit downlink communications through transceiver 401 over a radio interface to one or more mobile terminals UEs and/or to receive uplink communications through transceiver 401 from one or more mobile terminals UEs over a radio interface. Similarly, processing circuitry 403 may control network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processing circuitry 403, processing circuitry 403 performs respective operations (e.g., operations discussed below with respect to Example Embodiments relating to RAN nodes).

According to some other embodiments, a network node may be implemented as a core network CN node without a transceiver. In such embodiments, transmission to a wireless device UE may be initiated by the network node so that transmission to the wireless device is provided through a network node including a transceiver (e.g., through a base station or RAN node). According to embodiments where the network node is a RAN node including a transceiver, initiating transmission may include transmitting through the transceiver.

Figure 5:
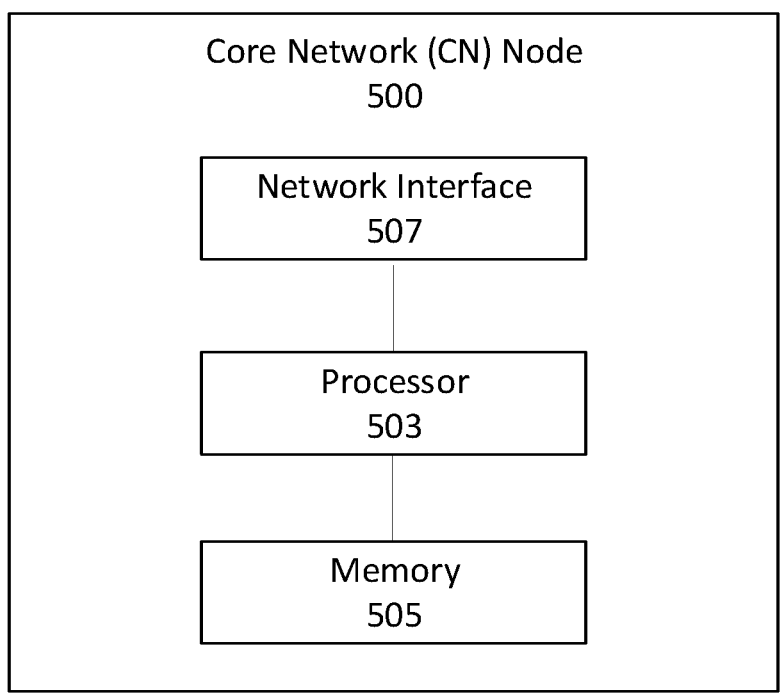
FIG. 5 is a block diagram illustrating a core network CN node (e.g., an AMF node, a PCF node, an NRF node, an SMF node, etc.) according to some embodiments of inventive concepts.

FIG. 5 is a block diagram illustrating elements of a core network CN node 500 (e.g., an SMF node, an AMF node, a PCF node, an NRF node, etc.) of a communication network configured to provide cellular communication according to embodiments of inventive concepts. In accordance with some embodiments of the inventive concepts, CN node 500 is used for the AMF node 102, PCF node 104, NRF node 110, and SMF node 112 in FIGS. 1A-1B and 2. As shown, the CN node may include network interface circuitry 507 (also referred to as a network interface) configured to provide communications with other nodes of the core network and/or the radio access network RAN. The CN node may also include a processing circuitry 503 (also referred to as a processor) coupled to the network interface circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the CN node may be performed by processing circuitry 503 and/or network interface circuitry 507. For example, processing circuitry 503 may control network interface circuitry 507 to transmit communications through network interface circuitry 507 to one or more other network nodes and/or to receive communications through network interface circuitry from one or more other network nodes. Moreover, modules may be stored in memory 505, and these modules may provide instructions so that when instructions of a module are executed by processing circuitry 503, processing circuitry 503 performs respective operations (e.g., operations discussed below with respect to Example Embodiments relating to core network nodes).

Operations of the wireless device 300 (implemented using the structure of the block diagram of FIG. 3) will now be discussed with reference to the flow chart of FIG. 6 according to some embodiments of inventive concepts. For example, modules may be stored in memory 305 of FIG. 3, and these modules may provide instructions so that when the instructions of a module are executed by respective wireless device processing circuitry 303, processing circuitry 303 performs respective operations of the flow chart.

Figure 6:
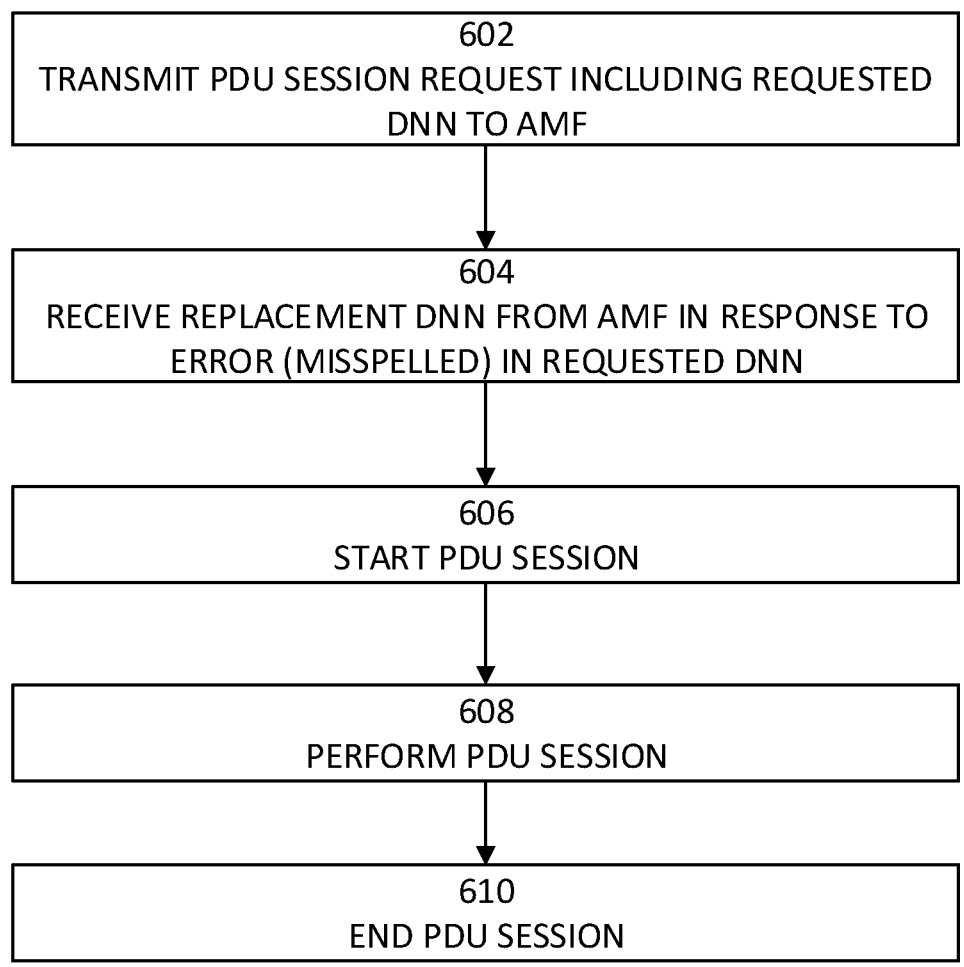
FIG. 6 is a flow chart illustrating operations of a wireless device or UE according to some embodiments of inventive concepts.

FIG. 6 is a flow chart illustrating operations of a wireless device or UE according to some embodiments of inventive concepts. In accordance with an embodiment, the operations in FIG. 6 are embodied in and performed by the wireless device or UE 300 in FIG. 3 and UE 114 in FIGS. 1A-1B and 2. In block 602, the UE transmits a PDU session request including a requested DNN to the AMF node.

In block 604, a replacement DNN is received from the AMF node in response to an error, for example a misspelling, syntax error or other error in the requested DNN. The process for providing the replacement DNN or a manipulated DNN are operations associated with the AMF node 102 described with reference to FIGS. 7A-7E and the PCF node 104 described with reference to FIGS. 8A-8C.

In block 606, the PDU session is started. In block 608, the PDU session is performed and in block 610, the PDU session is ended.

Various operations from the flow chart of FIG. 6 may be optional with respect to some embodiments of wireless devices or UEs and related methods.

Operations of a Core Network CN node 500 (implemented using the structure of FIG. 5) will now be discussed with reference to the flow charts of FIGS. 7A-7E and 8A-8C according to some embodiments of inventive concepts. For example, modules may be stored in memory 505 of FIG. 5, and these modules may provide instructions so that when the instructions of a module are executed by respective CN node processing circuitry 503, processing circuitry 503 performs respective operations of the flow chart.

FIGS. 7A-7E are a flow chart illustrating operations of a core access and mobility management function (AMF) node according to some embodiments of inventive concepts. In accordance with an embodiment, the operations are embodied in and performed by the AMF node 102 in FIGS. 1A-1B and 2. In block 702, one or more triggers are received from a PCF node by an AMF node. Operations for receiving the set of generic DNN manipulation triggers and the set of UE unique DNN manipulation triggers will be described with reference to FIG. 7C. The triggers are stored by the AMF node.

In block 704, a protocol data unit (PDU) session request is received from the UE. The PDU session request includes a requested data network name (DNN).

In block 706, the subscription of the UE is checked using subscription information in the UDM node 106 (FIG. 1A) similar to that previously described. The requested DNN is compared to subscription information stored by the UDM node 106.

In block 708, a determination is made if there is a match between the requested DNN and the subscription information. If there is a match, the method 700 advances to block 726. If there is not a match between the requested DNN and the subscription information, the method 700 advances to block 710 in FIG. 7C.

In block 710, a determination is made if a trigger has been activated. In some embodiments of the inventive concepts described herein, the trigger is one of a set of generic DNN manipulation triggers or a set of UE unique manipulation triggers. In accordance with the embodiment in FIG. 7C, if a trigger has not been activated, the AMF node rejects the PDU session request in block 712. In other embodiments, other actions may be performed. If a trigger is activated in block 710, the method 700 advances to block 714.

In block 714, a message is transmitted to the PCF node to replace the requested DNN with a replacement DNN in response to the requested DNN not matching the subscription information and the trigger being activated. The message includes the requested DNN and optionally other relevant information. Examples of the other relevant information include the UE geographic location, UE network capability, etc.

In block 716, the replacement DNN is received from the PCF node by the AMF node. In block 718, the replacement DNN is transmitted to the UE for the UE to use the replacement DNN in future PDU session requests.

In block 720, the replacement DNN 720 is transmitted to a network repository function (NRF) node for selection of a session management function (SMF) node. In block 722, a notification of a selected SMF node is received by the AMF node.

In block 724, a PDU session request message is forwarded by the AMF node to the selected SMF node. In block 725, the PDU session is established between the UE and the selected SMF node.

Figure 7A:
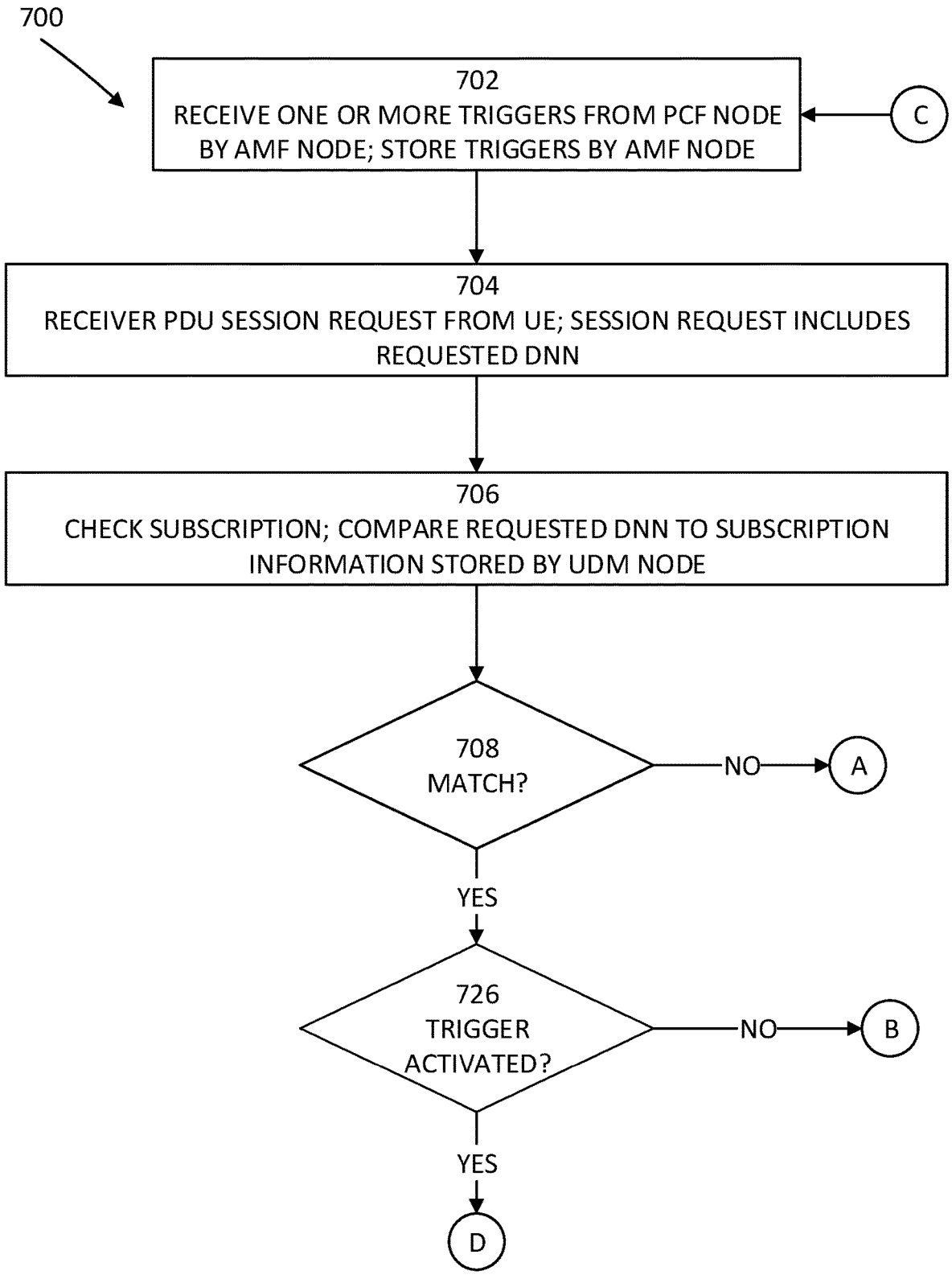
Figure 7D:
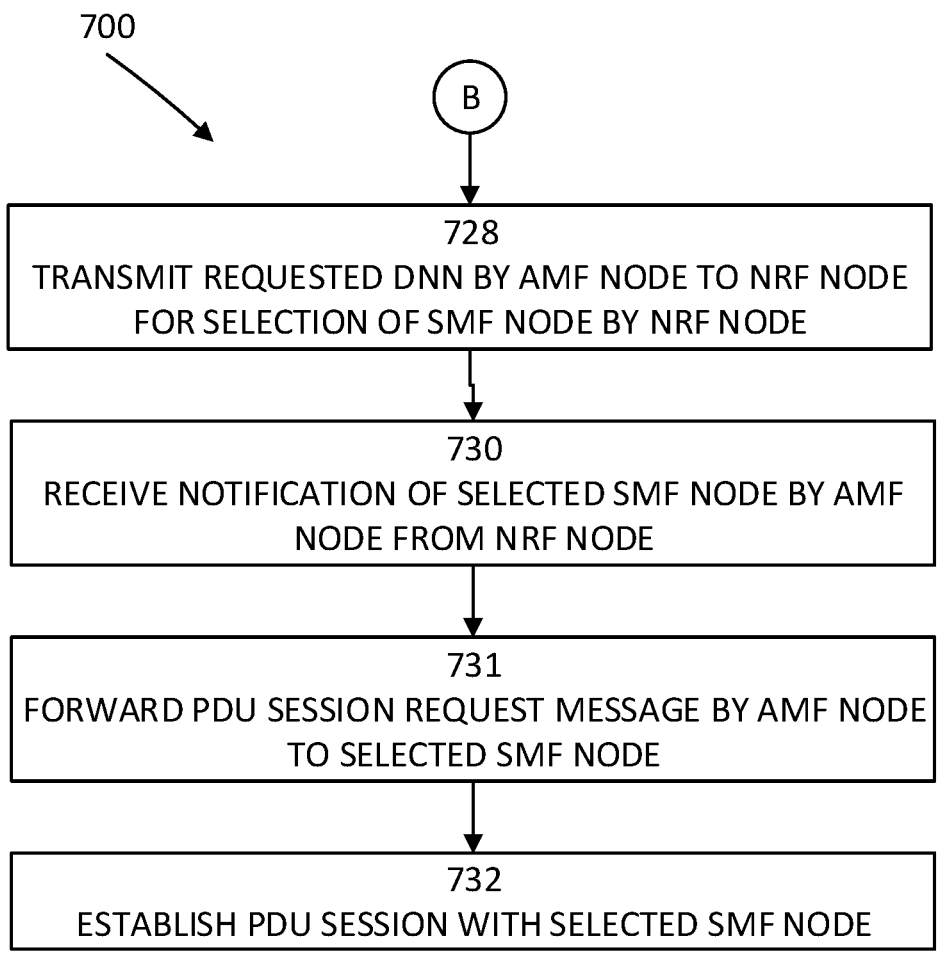

Returning to block 708 in FIG. 7A, as previously described, if the requested DNN matches the subscription information in block 708, the method 700 advances to block 726. In block 726, a determination is made whether a trigger has been activated. In some embodiments of the inventive concepts described herein, the trigger is one of a set of generic DNN manipulation triggers or a set of UE unique manipulation triggers If a trigger has not been activated, the method 700 advances to block 728 in FIG. 7D. In block 728, the requested DNN is transmitted by the AMF node to the NRF node for selection of an SMF node.

In block 730, a notification of the selected SMF node is received by the AMF node from the NRF node. In block 731, the PDU session request is forwarded to the selected SMF node. In block 732, the PDU session is established between the UE and the selected SMF node.

Returning to block 726 in FIG. 7A, if a determination is made that a trigger is activated in block 726, the method 700 advances to block 734 in FIG. 7B. In block 734, the requested DNN is transmitted to the PCF node for manipulation or negotiation of the requested DNN in response to the requested DNN matching the subscription information and the trigger being activated. Manipulation of the requested DNN will be described in more detail with reference to block 804 in FIG. 8A.

In block 736, a manipulated DNN 736 or negotiated DNN to replace the requested DNN is received from the PCF node in response to the trigger being activated and there being a match between the requested DNN and the subscription information.

In block 738, the manipulated or negotiated DNN is transmitted by the AMF node to an NRF node for selection of an SMF node. In block 740, notification of the selected SMF node is received by the AMF node from the NRF node.

In block 741, the PDU session request message is forwarded by the AMF node to the selected SMF node. In block 742, the PDU session is established between the UE and the selected SMF node.

Referring to FIG. 7E, FIG. 7E describes how the one or more triggers are received by the AMF node in block 702. In accordance with some embodiments of the inventive concepts the one or more triggers include a set of generic DNN manipulation triggers and a set of UE unique DNN manipulation triggers.

In block 744, a peer-to-peer relationship is established by the AMF node with a policy control function (PCF) node. In block 746, the AMF node subscribes to the set of generic DNN manipulation triggers from the PCF node. As previously described, in accordance with an embodiment, the generic DNN manipulation triggers are received by the AMF node and stored by the AMF node. As previously described, examples of a set of generic DNN manipulation triggers include but are not necessarily limited to parts of a permanent equipment identifier (PEI) identifying a specific range of UE and/or a subscriber permanent identifier (SUPI) range. A trigger is activated in response to at least one of the PEI parts being within the specific range of UE or the SUPI being within the SUPI range.

In block 748, an initial registration from a particular UE is received by the AMF node. In block 750, an association is established between the particular UE and the PCF node. In block 752, the set of UE unique DNN manipulation triggers are received from the PCF node by the AMF node. In block 754, certain data is provided by the AMF node to the PCF node in response to one of the set of UE unique DNN manipulation triggers being activated or matched. As previously described, the set of UE unique manipulation triggers are based on one more characteristics of a particular UE. Examples of the one or more UE characteristics include but are not necessarily limited to the MSISDN of the particular UE, the geographic location of the particular UE, and a requested data network name (DNN) included in a PDU session request (1 in FIG. 2) from a particular UE 114. A trigger is activated in response to one of the UE characteristics matching a preset value.

The set of generic DNN manipulation triggers and the set of UE unique DNN manipulation triggers are stored (block 702) separately by the AMF node. Activation of any of the triggers is determined or checked during establishment of each PDU session before selection of a session management function (SMF) node.

Figure 8A:
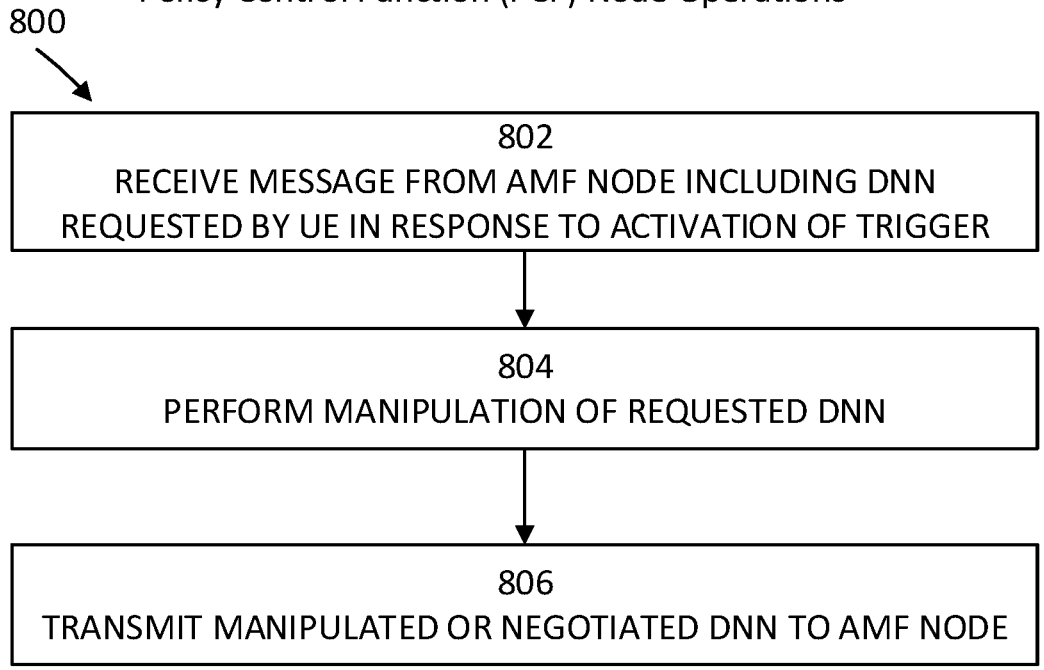
Figure 8B:
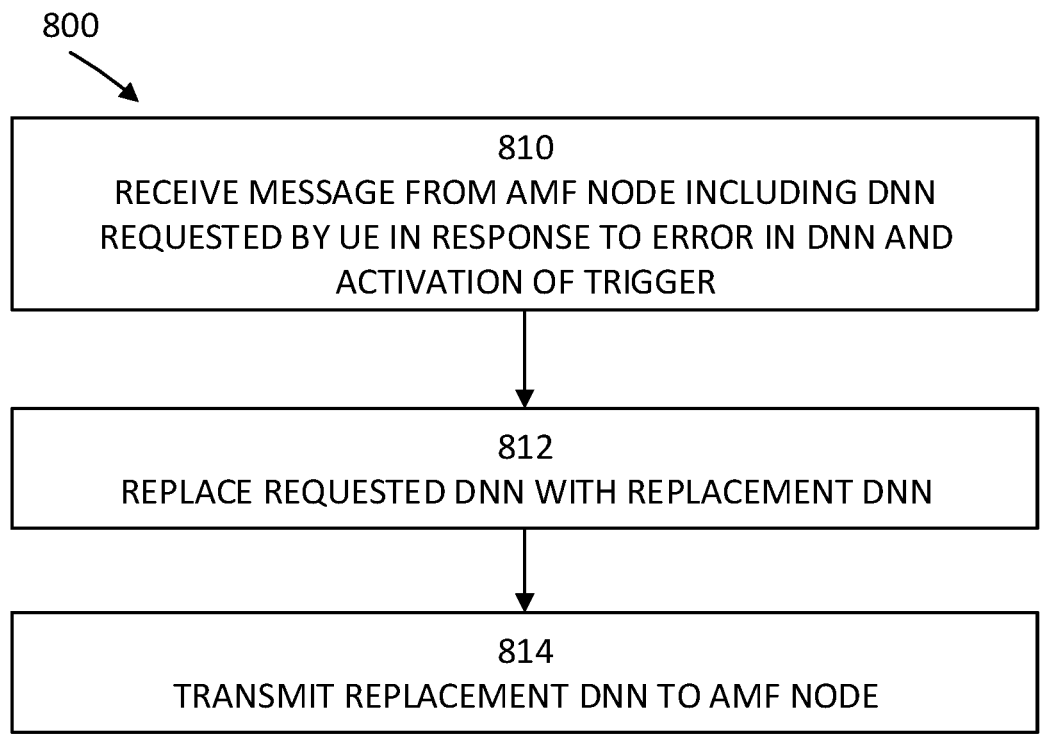

FIGS. 8A-8C are flow charts illustrating a method 800 of operations of a core policy control function (PCF) node according to some embodiments of inventive concepts. Referring to FIG. 8A, in block 802, a message is received by the PCF node from the AMF node including a DNN requested by a UE in response to activation of a trigger.

In block 804, manipulation of the requested DNN is performed. In accordance with embodiments of the inventive concepts, manipulating the requested DNN includes adding information to the requested DNN. Examples of the information added to the requested DNN include but is not necessarily limited to adding at least one of a mobile station international directory number (MSISDN), a geographic location of the UE, a permanent equipment identifier (PEI), a subscriber permanent identifier (SUPI), or network capability of the UE to the requested DNN.

In block 806, the manipulated or negotiated DNN is transmitted to the AMF node for establishing the PDU session similar to that described with reference to blocks 736-742 in FIG. 7B.

Referring to FIG. 8B, in block 810, a message is received by the PCF node from the AMF node in response to an error in the requested DNN and activation of a trigger. An error in the requested DNN is detected by the requested DNN not matching the subscription information in blocks 706 and 708 of FIG. 7A and a trigger is activated in block 710 of FIG. 7C.

In block 812, the requested DNN is replace with a replacement DNN by the PCF node. In block 814, the replacement DNN is transmitted to the AMF node.

Referring to FIG. 8C, in block 816, the PCF node enters into a peer-to-peer relationship with the AMF node, initiated by the AMF node. In block 818, a subscription to a set of generic DNN manipulation triggers is provided to the AMF node by the PCF node. The set of generic DNN manipulation triggers include one of PEI parts identifying a specific range of UE or a SUPI range. The trigger is activated in response to at least one of the PEI parts being within the specific range of UE or the SUPI being within the SUPI range.

In block 820, an association is established with a particular UE in response to initial registration from the particular UE with the AMF node. In block 822, a set of UE unique DNN manipulation triggers are transmitted to the AMF node by the PCF node. The set of UE unique DNN manipulation triggers are based on one or more characteristics of a particular UE. Examples of the one or more characteristics include but are not limited to the MSISDN of the particular UE, the geographic location of the particular UE, and the requested DNN.

In block 824, certain data is requested from the AMF node by the PCF node in response to one of the UE unique DNN manipulation triggers being activated. In block 826, the certain data is received from the AMF node by the PCF node.

In block 828, the certain data is used by the PCF node to make decisions during establishment of a PDU session for the UE. For example, to replace the requested DNN or "decorate" the requested DNN, that is, the PCF nodes append specific data to the existing DNN or requested DNN similar to that previously described, e.g., requested DNN=name.com and decorated or manipulated DNN=name.<location>.com.

Example embodiments are discussed below.

1. A method (700) of operating a core access and mobility management function (AMF) node configured to operate in a communications network (960), comprising:
   receiving (704) a protocol data unit (PDU) session request from user equipment (UE), the PDU session request including a requested data network name (DNN);
   determining (710, 726) if a trigger has been activated; and
   receiving (736, 716) a manipulated DNN or replacement DNN for the requested DNN in response to the trigger being activated.

2. The method of embodiment 1, further comprising:
   comparing (706) the requested DNN to subscriber information; and
   determining (708) if there is a match between the requested DNN and the subscriber information.

3. The method of embodiment 2, further comprising:
   transmitting (714) a message and the requested DNN and optionally other relevant information e.g. UE location, UE network capability to a policy control function (PCF) node to replace the requested DNN with the replacement DNN in response to the requested DNN not matching the subscriber information and the trigger being activated; and
   receiving (716) the replacement DNN from the PCF node.

4. The method of embodiment 3, further comprising transmitting (718) the replacement DNN to the UE for the UE to use the replacement DNN in future PDU session requests.

5. The method of any of embodiments 3 and 4, further comprising:
   transmitting (720) the replacement DNN to a network repository function (NRF) node for selection of a session management function (SMF) node; and
   establishing (725) a PDU session with a selected SMF node.

6. The method of embodiment 2, further comprising transmitting (734) the requested DNN to a PCF node for manipulation or negotiation of the requested DNN in response to the requested DNN matching the subscriber information and the trigger being activated.

7. The method of embodiment 6, wherein manipulating (804) the requested DNN comprises adding information to the requested DNN.

8. The method of embodiment 7, wherein adding the information to the requested DNN comprises adding at least one of a mobile station international directory number (MSISDN), a geographic location of the UE, a permanent equipment identifier (PEI), a subscriber permanent identifier (SUPI), or UE network capability to the requested DNN.

9. The method of any of embodiments 6-8, wherein the trigger comprises at least one of a set of generic DNN manipulation triggers and a set of UE unique manipulation triggers.

10. The method of embodiment 9, wherein the set of generic DNN manipulation triggers comprise at least one of PEI parts identifying a specific range of UE and a SUPI range, wherein the trigger is activated in response to at least one of the PEI parts being within the specific range or the SUPI being within the SUPI range.

11. The method of any of embodiments 9-10, further comprising:
initiating (744) a peer-to-peer relationship with a policy control function (PCF) node; and
subscribing (746) to the set of generic DNN manipulation triggers.

12. The method of embodiment 9, wherein the set of UE unique manipulation triggers are based on one or more characteristics of a particular UE, wherein the one or more characteristics comprise the MSISDN of the particular UE, the location of the particular UE, and the requested DNN.

13. The method of embodiment 12, further comprising:
receiving (748) an initial registration from the particular UE;
establishing (750) an association between the particular UE and a policy control function (PCF) node; and
receiving (752) the set of UE unique DNN manipulation triggers from the PCF node, wherein certain data is provided to the PCF node in response to one of the UE unique DNN manipulation triggers being activated, the certain data being used by the PCF node to make decisions during establishment of a PDU session.

14. The method of any of embodiments 9-13, further comprising:
storing (702) the set of generic DNN manipulation triggers and the set of UE unique triggers separately; and
determining (726) activation of the triggers during establishment of each PDU session before selection of a session management function (SMF) node.

15. A core access and mobility management (AMF) node (500) configured to operate in a communications network (960), the AMF node comprising:
processing circuitry (503); and
memory (505) coupled to the processing circuitry, wherein the memory includes instructions that when executed by the processing circuitry causes the AMF node to perform operations according to Embodiments 1-14.

16. A core access and mobility management (AMF) node (500) configured to operate in a communication network (960), wherein the AMF node is adapted to perform according to any of the Embodiments 1-14.

17. A computer program comprising program code to be executed by processing circuitry (503) of an AMF node (500) configured to operate in a communication network (960), whereby execution of the program code causes the AMF node (500) to perform operations according to any of embodiments 1-14.

18. A computer program product comprising a non-transitory storage medium including program code to be executed by processing circuitry (503) of an AMF node (500) configured to operate in a communication network, whereby execution of the program code causes the wireless device (300) to perform operations according to any of embodiments 1-14.

19. A method (800) of operating a policy control function (PCF) node configured to operate in a communications network (960), the method comprising:
receiving (802) a message from an AMF node in response to activation of a trigger, the message including a requested DNN and optionally other relevant information e.g. UE location, UE network capability, wherein the requested DNN is includes in a PDU session request received by the AMF node from a UE;
performing (804) a manipulation or replacing (812) the requested DNN with a manipulated DNN or a replacement DNN; and
transmitting (806, 814) the manipulated DNN or the replacement DNN to the AMF node.

20. The method of embodiment 19, wherein manipulating (804) the requested DNN comprises adding information to the requested DNN.

21. The method of embodiment 20, wherein adding the information to the requested DNN comprises adding at least one of a mobile station international directory number (MSISDN), a geographic location of the UE, a permanent equipment identifier (PEI), a subscriber permanent identifier (SUPI), or UE network capability to the requested DNN.

22. The method of any of embodiments 19-21, wherein the trigger comprises at least one of a set of generic DNN manipulation triggers and a set of UE unique manipulation triggers.

23. The method of embodiments 22, further comprising:
entering (816) into a peer-to-peer relationship initiated by the AMF node; and
providing (818) a subscription to the set of generic DNN manipulation triggers.

24. The method of embodiment 23, wherein the set of generic DNN manipulation triggers comprise at least one of PEI parts identifying a specific range of UE and a SUPI range, wherein the trigger is activated in response to at least one of the PEI parts being within the specific range or the SUPI being within the SUPI range.

25. The method of claim 22, further comprising:
establishing (820) an association with a particular UE in response to initial registration from the particular UE with the AMF node; and
transmitting (822) the set of UE unique DNN manipulation triggers to the AMF node.

26. The method of claim 25, further comprising:
requesting (824) certain data from the AMF node in response to one of the UE unique DNN manipulation triggers being activated;
receiving (826) the certain data from the AMF node; and
using (828) the certain data to make decisions during establishment of a PDU session for the UE.

27. A policy control function (PCF) node (500) configured to operate in a communications network (906), the AMF node comprising:
processing circuitry (503); and
memory (505) coupled to the processing circuitry, wherein the memory includes instructions that when executed by the processing circuitry causes the AMF node to perform operations according to Embodiments 19-26.

28. A policy control function (PCF) node (500) configured to operate in a communication network, wherein the PCF node is adapted to perform according to any of the Embodiments 19-26.

29. A computer program comprising program code to be executed by processing circuitry (503) of a PCF node (500) configured to operate in a communication network, whereby execution of the program code causes the PCF node (500) to perform operations according to any of embodiments 19-26.

30. A computer program product comprising a non-transitory storage medium including program code to be executed by processing circuitry (503) of a PCF node (500) configured to operate in a communication network, whereby execution of the program code causes the PCF node (500) to perform operations according to any of embodiments 19-26.

References are identified below.
1. 4G Solution brief: APN Resolve and Redirect for LTE Access, 62/221 02-AXB 250 05/8 Uen AS
2. S2-1902114, S2-1902115 and S2-1902116 contributions to 3GPP SA2 meeting #131.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 9:
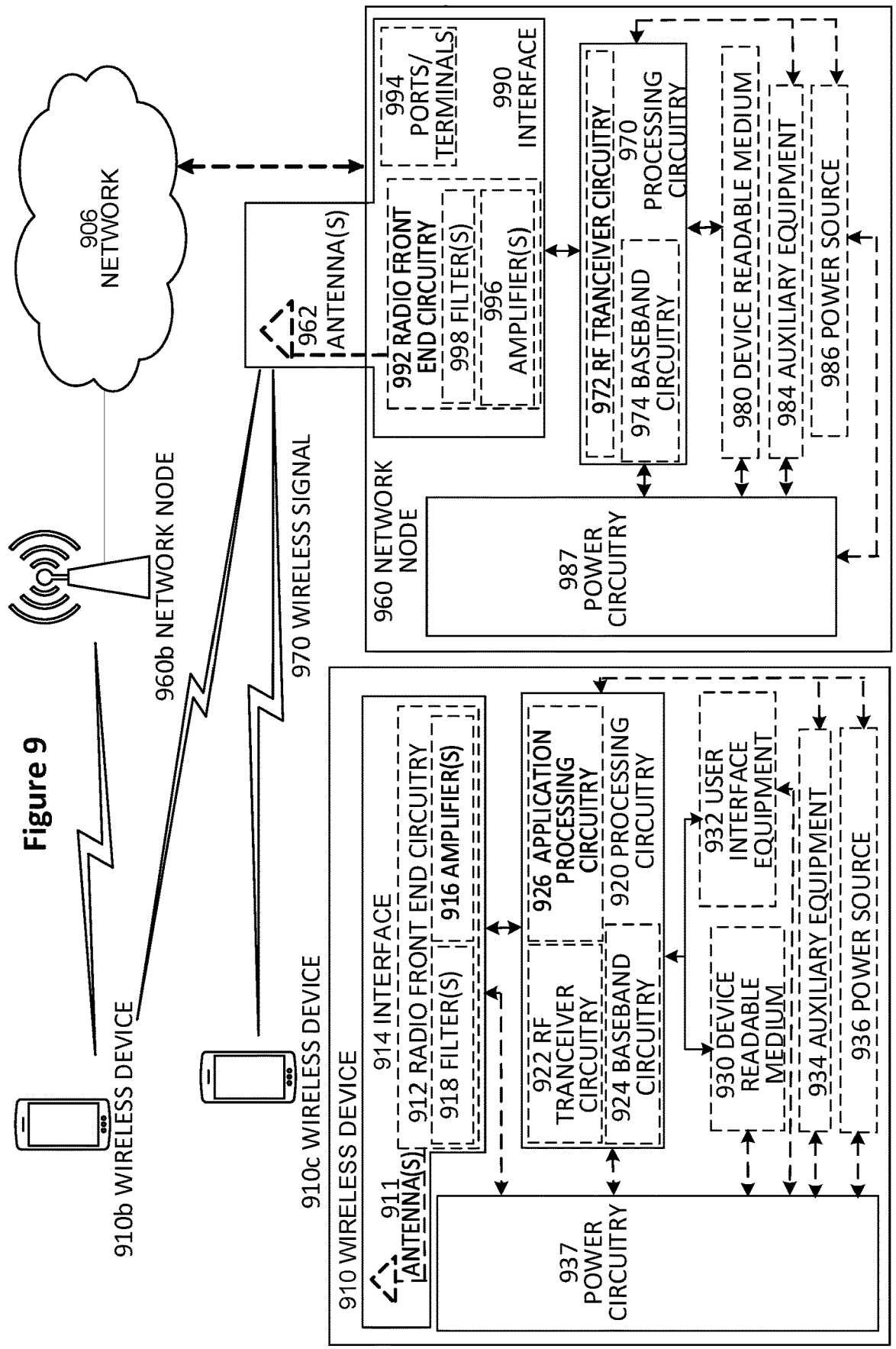
FIG. 9 is a block diagram of a wireless network in accordance with some embodiments.

FIG. 9 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 906, network nodes 960 and 960*b*, and WDs 910, 910*b*, and 910*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 960 and wireless device (WD) 910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and WD 910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 960 includes processing circuitry 970, device readable medium 980, interface 990, auxiliary equipment 984, power source 986, power circuitry 987, and antenna 962. Although network node 960 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 960 are depicted as single boxes located within a larger box, or nested within multiple boxes, in practice, a network node may comprise multiple different physical components that make up a single illustrated component (e.g., device readable medium 980 may comprise multiple separate hard drives as well as multiple RAM modules).

Similarly, network node 960 may be composed of multiple physically separate components (e.g., a NodeB component and a RNC component, or a BTS component and a BSC component, etc.), which may each have their own respective components. In certain scenarios in which network node 960 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 960 may be configured to support multiple radio access technologies (RATs). In such embodiments, some components may be duplicated (e.g., separate device readable medium 980 for the different RATs) and some components may be reused (e.g., the same antenna 962 may be shared by the RATs). Network node 960 may also include multiple sets of the various illustrated components for different wireless technologies integrated into network node 960, such as, for example, GSM, WCDMA, LTE, NR, WiFi, or Bluetooth wireless technologies. These wireless technologies may be integrated into the same or different chip or set of chips and other components within network node 960.

Processing circuitry 970 is configured to perform any determining, calculating, or similar operations (e.g., certain obtaining operations) described herein as being provided by a network node. These operations performed by processing circuitry 970 may include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960 components, such as device readable medium 980, network node 960 functionality. For example, processing circuitry 970 may execute instructions stored in device readable medium 980 or in memory within processing circuitry 970. Such functionality may include providing any of the various wireless features, functions, or benefits discussed herein. In some embodiments, processing circuitry 970 may include a system on a chip (SOC).

In some embodiments, processing circuitry 970 may include one or more of radio frequency (RF) transceiver circuitry 972 and baseband processing circuitry 974. In some embodiments, radio frequency (RF) transceiver circuitry 972 and baseband processing circuitry 974 may be on separate chips (or sets of chips), boards, or units, such as radio units and digital units. In alternative embodiments, part or all of RF transceiver circuitry 972 and baseband processing circuitry 974 may be on the same chip or set of chips, boards, or units In certain embodiments, some or all of the functionality described herein as being provided by a network node, base station, eNB or other such network device may be performed by processing circuitry 970 executing instructions stored on device readable medium 980 or memory within processing circuitry 970. In alternative embodiments, some or all of the functionality may be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960, but are enjoyed by network node 960 as a whole, and/or by end users and the wireless network generally.

Device readable medium 980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 970. Device readable medium 980 may store any suitable instructions, data or information, including a computer program, software, an application including one or more of logic, rules, code, tables, etc. and/or other instructions capable of being executed by processing circuitry 970 and, utilized by network node 960. Device readable medium 980 may be used to store any calculations made by processing circuitry 970 and/or any data received via interface 990. In some embodiments, processing circuitry 970 and device readable medium 980 may be considered to be integrated.

Interface 990 is used in the wired or wireless communication of signaling and/or data between network node 960, network 906, and/or WDs 910. As illustrated, interface 990 comprises port(s)/terminal(s) 994 to send and receive data, for example to and from network 906 over a wired connection. Interface 990 also includes radio front end circuitry 992 that may be coupled to, or in certain embodiments a part of, antenna 962. Radio front end circuitry 992 comprises filters 998 and amplifiers 996. Radio front end circuitry 992 may be connected to antenna 962 and processing circuitry 970. Radio front end circuitry may be configured to condition signals communicated between antenna 962 and processing circuitry 970. Radio front end circuitry 992 may receive digital data that is to be sent out to other network nodes or WDs via a wireless connection. Radio front end circuitry 992 may convert the digital data into a radio signal having the appropriate channel and bandwidth parameters using a combination of filters 998 and/or amplifiers 996. The radio signal may then be transmitted via antenna 962. Similarly, when receiving data, antenna 962 may collect radio signals which are then converted into digital data by radio front end circuitry 992. The digital data may be passed to processing circuitry 970. In other embodiments, the interface may comprise different components and/or different combinations of components.

In certain alternative embodiments, network node 960 may not include separate radio front end circuitry 992, instead, processing circuitry 970 may comprise radio front end circuitry and may be connected to antenna 962 without separate radio front end circuitry 992. Similarly, in some embodiments, all or some of RF transceiver circuitry 972 may be considered a part of interface 990. In still other embodiments, interface 990 may include one or more ports or terminals 994, radio front end circuitry 992, and RF transceiver circuitry 972, as part of a radio unit (not shown), and interface 990 may communicate with baseband processing circuitry 974, which is part of a digital unit (not shown).

Antenna 962 may include one or more antennas, or antenna arrays, configured to send and/or receive wireless signals. Antenna 962 may be coupled to radio front end circuitry 990 and may be any type of antenna capable of transmitting and receiving data and/or signals wirelessly. In some embodiments, antenna 962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 962 may be separate from network node 960 and may be connectable to network node 960 through an interface or port.

Antenna 962, interface 990, and/or processing circuitry 970 may be configured to perform any receiving operations and/or certain obtaining operations described herein as being performed by a network node. Any information, data and/or signals may be received from a wireless device, another network node and/or any other network equipment. Similarly, antenna 962, interface 990, and/or processing circuitry 970 may be configured to perform any transmitting operations described herein as being performed by a network node. Any information, data and/or signals may be transmitted to a wireless device, another network node and/or any other network equipment.

Power circuitry 987 may comprise, or be coupled to, power management circuitry and is configured to supply the components of network node 960 with power for performing the functionality described herein. Power circuitry 987 may receive power from power source 986. Power source 986 and/or power circuitry 987 may be configured to provide power to the various components of network node 960 in a form suitable for the respective components (e.g., at a voltage and current level needed for each respective component). Power source 986 may either be included in, or external to, power circuitry 987 and/or network node 960. For example, network node 960 may be connectable to an external power source (e.g., an electricity outlet) via an input circuitry or interface such as an electrical cable, whereby the external power source supplies power to power circuitry 987. As a further example, power source 986 may comprise a source of power in the form of a battery or battery pack which is connected to, or integrated in, power circuitry 987. The battery may provide backup power should the external power source fail. Other types of power sources, such as photovoltaic devices, may also be used.

Alternative embodiments of network node 960 may include additional components beyond those shown in FIG. 9 that may be responsible for providing certain aspects of the network node's functionality, including any of the functionality described herein and/or any functionality necessary to support the subject matter described herein. For example, network node 960 may include user interface equipment to allow input of information into network node 960 and to allow output of information from network node 960. This may allow a user to perform diagnostic, maintenance, repair, and other administrative functions for network node 960.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 910 includes antenna 911, interface 914, processing circuitry 920, device readable medium 930, user interface equipment 932, auxiliary equipment 934, power source 936 and power circuitry 937. WD 910 may include multiple sets of one or more of the illustrated components for different wireless technologies supported by WD 910, such as, for example, GSM, WCDMA, LTE, NR, WiFi, WiMAX, or Bluetooth wireless technologies, just to mention a few. These wireless technologies may be integrated into the same or different chips or set of chips as other components within WD 910.

Antenna 911 may include one or more antennas or antenna arrays, configured to send and/or receive wireless signals, and is connected to interface 914. In certain alternative embodiments, antenna 911 may be separate from WD 910 and be connectable to WD 910 through an interface or port. Antenna 911, interface 914, and/or processing circuitry 920 may be configured to perform any receiving or transmitting operations described herein as being performed by a WD. Any information, data and/or signals may be received from a network node and/or another WD. In some embodiments, radio front end circuitry and/or antenna 911 may be considered an interface.

As illustrated, interface 914 comprises radio front end circuitry 912 and antenna 911. Radio front end circuitry 912 comprise one or more filters 918 and amplifiers 916. Radio front end circuitry 914 is connected to antenna 911 and processing circuitry 920, and is configured to condition signals communicated between antenna 911 and processing circuitry 920. Radio front end circuitry 912 may be coupled to or a part of antenna 911. In some embodiments, WD 910 may not include separate radio front end circuitry 912; rather, processing circuitry 920 may comprise radio front end circuitry and may be connected to antenna 911. Similarly, in some embodiments, some or all of RF transceiver circuitry 922 may be considered a part of interface 914. Radio front end circuitry 912 may receive digital data that is to be sent out to other network nodes or WDs via a wireless connection. Radio front end circuitry 912 may convert the digital data into a radio signal having the appropriate channel and bandwidth parameters using a combination of filters 918 and/or amplifiers 916. The radio signal may then be transmitted via antenna 911. Similarly, when receiving data, antenna 911 may collect radio signals which are then converted into digital data by radio front end circuitry 912. The digital data may be passed to processing circuitry 920. In other embodiments, the interface may comprise different components and/or different combinations of components.

Processing circuitry 920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 910 components, such as device readable medium 930, WD 910 functionality. Such functionality may include providing any of the various wireless features or benefits discussed herein. For example, processing circuitry 920 may execute instructions stored in device readable medium 930 or in memory within processing circuitry 920 to provide the functionality disclosed herein.

As illustrated, processing circuitry 920 includes one or more of RF transceiver circuitry 922, baseband processing circuitry 924, and application processing circuitry 926. In other embodiments, the processing circuitry may comprise different components and/or different combinations of components. In certain embodiments processing circuitry 920 of WD 910 may comprise a SOC. In some embodiments, RF transceiver circuitry 922, baseband processing circuitry 924, and application processing circuitry 926 may be on separate chips or sets of chips. In alternative embodiments, part or all of baseband processing circuitry 924 and application processing circuitry 926 may be combined into one chip or set of chips, and RF transceiver circuitry 922 may be on a separate chip or set of chips. In still alternative embodiments, part or all of RF transceiver circuitry 922 and baseband processing circuitry 924 may be on the same chip or set of chips, and application processing circuitry 926 may be on a separate chip or set of chips. In yet other alternative embodiments, part or all of RF transceiver circuitry 922, baseband processing circuitry 924, and application processing circuitry 926 may be combined in the same chip or set of chips. In some embodiments, RF transceiver circuitry 922 may be a part of interface 914. RF transceiver circuitry 922 may condition RF signals for processing circuitry 920.

In certain embodiments, some or all of the functionality described herein as being performed by a WD may be provided by processing circuitry 920 executing instructions stored on device readable medium 930, which in certain embodiments may be a computer-readable storage medium. In alternative embodiments, some or all of the functionality may be provided by processing circuitry 920 without executing instructions stored on a separate or discrete device readable storage medium, such as in a hard-wired manner. In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910 as a whole, and/or by end users and the wireless network generally.

Processing circuitry 920 may be configured to perform any determining, calculating, or similar operations (e.g., certain obtaining operations) described herein as being performed by a WD. These operations, as performed by processing circuitry 920, may include processing information obtained by processing circuitry 920 by, for example, converting the obtained information into other information, comparing the obtained information or converted information to information stored by WD 910, and/or performing one or more operations based on the obtained information or converted information, and as a result of said processing making a determination.

Device readable medium 930 may be operable to store a computer program, software, an application including one or more of logic, rules, code, tables, etc. and/or other instructions capable of being executed by processing circuitry 920. Device readable medium 930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 920. In some embodiments, processing circuitry 920 and device readable medium 930 may be considered to be integrated.

User interface equipment 932 may provide components that allow for a human user to interact with WD 910. Such interaction may be of many forms, such as visual, audial, tactile, etc. User interface equipment 932 may be operable to produce output to the user and to allow the user to provide input to WD 910. The type of interaction may vary depending on the type of user interface equipment 932 installed in WD 910. For example, if WD 910 is a smart phone, the interaction may be via a touch screen; if WD 910 is a smart meter, the interaction may be through a screen that provides usage (e.g., the number of gallons used) or a speaker that provides an audible alert (e.g., if smoke is detected). User interface equipment 932 may include input interfaces, devices and circuits, and output interfaces, devices and circuits. User interface equipment 932 is configured to allow input of information into WD 910, and is connected to processing circuitry 920 to allow processing circuitry 920 to process the input information. User interface equipment 932 may include, for example, a microphone, a proximity or other sensor, keys/buttons, a touch display, one or more cameras, a USB port, or other input circuitry. User interface equipment 932 is also configured to allow output of information from WD 910, and to allow processing circuitry 920 to output information from WD 910. User interface equipment 932 may include, for example, a speaker, a display, vibrating circuitry, a USB port, a headphone interface, or other output circuitry. Using one or more input and output interfaces, devices, and circuits, of user interface equipment 932, WD 910 may communicate with end users and/or the wireless network, and allow them to benefit from the functionality described herein.

Auxiliary equipment 934 is operable to provide more specific functionality which may not be generally performed by WDs. This may comprise specialized sensors for doing measurements for various purposes, interfaces for additional types of communication such as wired communications etc. The inclusion and type of components of auxiliary equipment 934 may vary depending on the embodiment and/or scenario.

Power source 936 may, in some embodiments, be in the form of a battery or battery pack. Other types of power sources, such as an external power source (e.g., an electricity outlet), photovoltaic devices or power cells, may also be used. WD 910 may further comprise power circuitry 937 for delivering power from power source 936 to the various parts of WD 910 which need power from power source 936 to carry out any functionality described or indicated herein. Power circuitry 937 may in certain embodiments comprise power management circuitry. Power circuitry 937 may additionally or alternatively be operable to receive power from an external power source; in which case WD 910 may be connectable to the external power source (such as an electricity outlet) via input circuitry or an interface such as an electrical power cable. Power circuitry 937 may also in certain embodiments be operable to deliver power from an external power source to power source 936. This may be, for example, for the charging of power source 936. Power circuitry 937 may perform any formatting, converting, or other modification to the power from power source 936 to make the power suitable for the respective components of WD 910 to which power is supplied.

Figure 10:
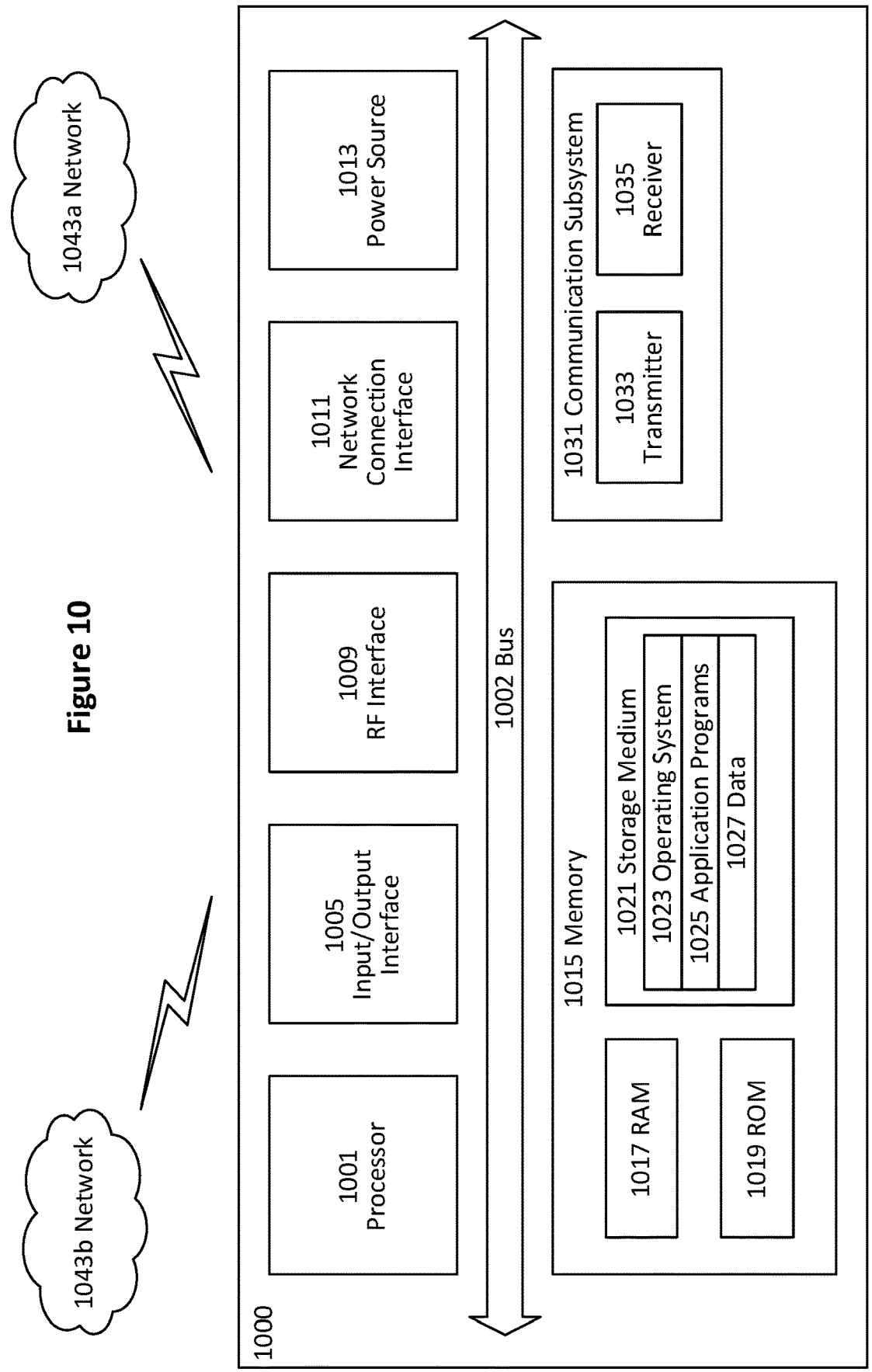
FIG. 10 is a block diagram of a user equipment in accordance with some embodiments.

FIG. 10 illustrates a user Equipment in accordance with some embodiments.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1000 may be any UE identified by the 3rd Generation Partnership Project (3GPP), including a NB-IoT UE, a machine type communication (MTC) UE, and/or an enhanced MTC (eMTC) UE. UE 1000, as illustrated in FIG. 10, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1000 includes processing circuitry 1001 that is operatively coupled to input/output interface 1005, radio frequency (RF) interface 1009, network connection interface 1011, memory 1015 including random access memory (RAM) 1017, read-only memory (ROM) 1019, and storage medium 1021 or the like, communication subsystem 1031, power source 1013, and/or any other component, or any combination thereof. Storage medium 1021 includes operating system 1023, application program 1025, and data 1027. In other embodiments, storage medium 1021 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1001 may be configured to process computer instructions and data. Processing circuitry 1001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1001 may include two central processing units (CPUs). Data may be information in a form suitable for use by a computer.

In the depicted embodiment, input/output interface 1005 may be configured to provide a communication interface to an input device, output device, or input and output device. UE 1000 may be configured to use an output device via input/output interface 1005. An output device may use the same type of interface port as an input device. For example, a USB port may be used to provide input to and output from UE 1000. The output device may be a speaker, a sound card, a video card, a display, a monitor, a printer, an actuator, an emitter, a smartcard, another output device, or any combination thereof. UE 1000 may be configured to use an input device via input/output interface 1005 to allow a user to capture information into UE 1000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1009 may be configured to provide a communication interface to RF components such as a transmitter, a receiver, and an antenna. Network connection interface 1011 may be configured to provide a communication interface to network 1043a. Network 1043a may encompass wired and/or wireless networks such as a local-area network (LAN), a wide-area network (WAN), a computer network, a wireless network, a telecommunications network, another like network or any combination thereof. For example, network 1043a may comprise a Wi-Fi network. Network connection interface 1011 may be configured to include a receiver and a transmitter interface used to communicate with one or more other devices over a communication network according to one or more communication protocols, such as Ethernet, TCP/IP, SONET, ATM, or the like. Network connection interface 1011 may implement receiver and transmitter functionality appropriate to the communication network links (e.g., optical, electrical, and the like). The transmitter and receiver functions may share circuit components, software or firmware, or alternatively may be implemented separately.

RAM 1017 may be configured to interface via bus 1002 to processing circuitry 1001 to provide storage or caching of data or computer instructions during the execution of software programs such as the operating system, application programs, and device drivers. ROM 1019 may be configured to provide computer instructions or data to processing circuitry 1001. For example, ROM 1019 may be configured to store invariant low-level system code or data for basic system functions such as basic input and output (I/O), startup, or reception of keystrokes from a keyboard that are stored in a non-volatile memory. Storage medium 1021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1021 may be configured to include operating system 1023, application program 1025 such as a web browser application, a widget or gadget engine or another application, and data file 1027. Storage medium 1021 may store, for use by UE 1000, any of a variety of various operating systems or combinations of operating systems.

Storage medium 1021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 may allow UE 1000 to access computer-executable instructions, application programs or the like, stored on transitory or non-transitory memory media, to off-load data, or to upload data. An article of manufacture, such as one utilizing a communication system may be tangibly embodied in storage medium 1021, which may comprise a device readable medium.

In FIG. 10, processing circuitry 1001 may be configured to communicate with network 1043b using communication subsystem 1031. Network 1043a and network 1043b may be the same network or networks or different network or networks. Communication subsystem 1031 may be configured to include one or more transceivers used to communicate with network 1043b. For example, communication subsystem 1031 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1033 and/or receiver 1035 to implement transmitter or receiver functionality, respectively, appropriate to the RAN links (e.g., frequency allocations and the like). Further, transmitter 1033 and receiver 1035 of each transceiver may share circuit components, software or firmware, or alternatively may be implemented separately.

In the illustrated embodiment, the communication functions of communication subsystem 1031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 may include cellular communication, Wi-Fi communication, Bluetooth communication, and GPS communication. Network 1043b may encompass wired and/or wireless networks such as a local-area network (LAN), a wide-area network (WAN), a computer network, a wireless network, a telecommunications network, another like network or any combination thereof. For example, network 1043b may be a cellular network, a Wi-Fi network, and/or a near-field network. Power source 1013 may be configured to provide alternating current (AC) or direct current (DC) power to components of UE 1000.

The features, benefits and/or functions described herein may be implemented in one of the components of UE 1000 or partitioned across multiple components of UE 1000. Further, the features, benefits, and/or functions described herein may be implemented in any combination of hardware, software or firmware. In one example, communication subsystem 1031 may be configured to include any of the components described herein. Further, processing circuitry 1001 may be configured to communicate with any of such components over bus 1002. In another example, any of such components may be represented by program instructions stored in memory that when executed by processing circuitry 1001 perform the corresponding functions described herein. In another example, the functionality of any of such components may be partitioned between processing circuitry 1001 and communication subsystem 1031. In another example, the non-computationally intensive functions of any of such components may be implemented in software or firmware and the computationally intensive functions may be implemented in hardware.

Figure 11:
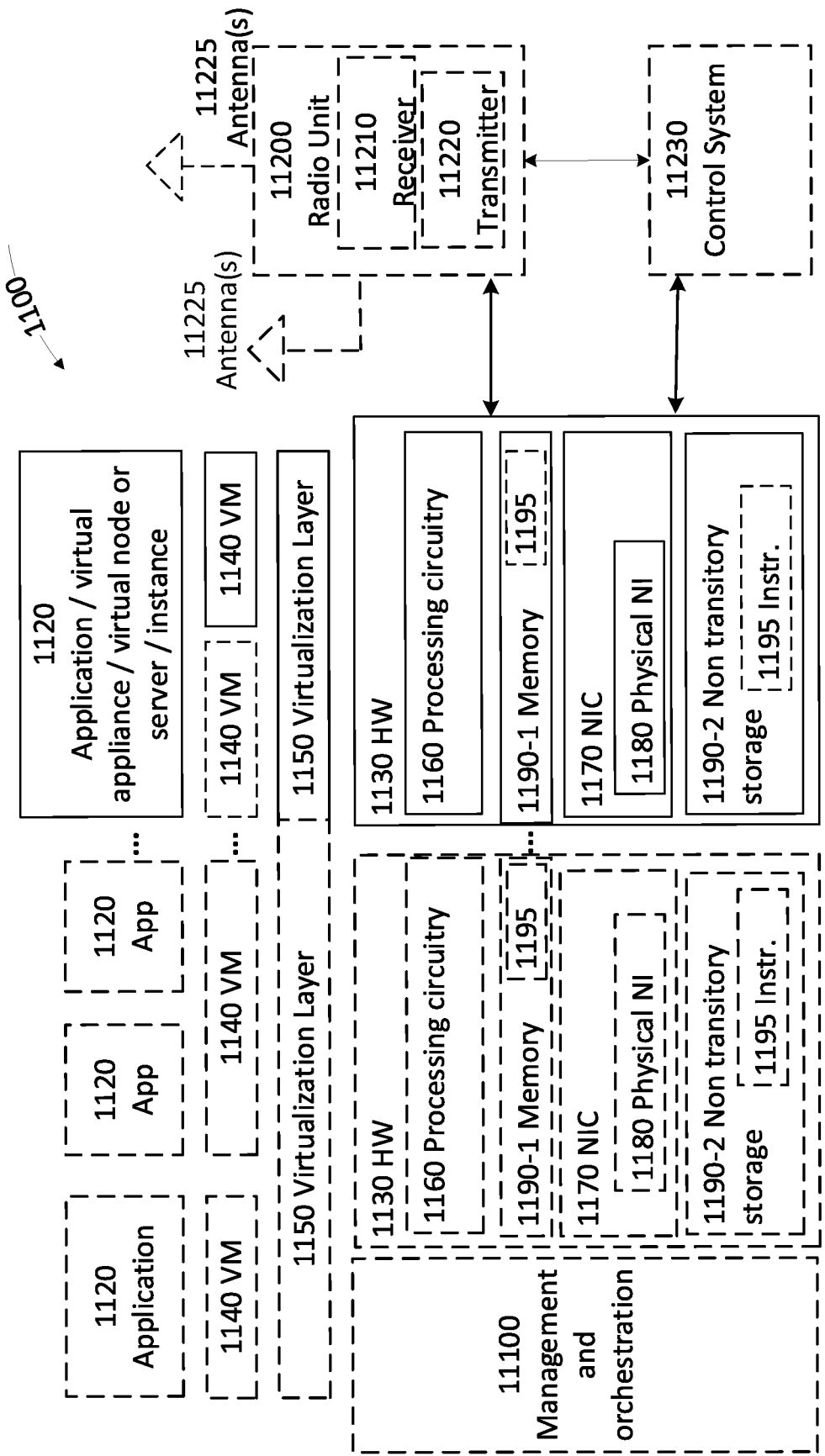
FIG. 11 is a block diagram of a virtualization environment in accordance with some embodiments.

FIG. 11 illustrates a virtualization environment in accordance with some embodiments.

FIG. 11 is a schematic block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node may be entirely virtualized.

The functions may be implemented by one or more applications 1120 (which may alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100, comprises general-purpose or special-purpose network hardware devices 1130 comprising a set of one or more processors or processing circuitry 1160, which may be commercial off-the-shelf (COTS) processors, dedicated Application Specific Integrated Circuits (ASICs), or any other type of processing circuitry including digital or analog hardware components or special purpose processors. Each hardware device may comprise memory 1190-1 which may be non-persistent memory for temporarily storing instructions 1195 or software executed by processing circuitry 1160. Each hardware device may comprise one or more network interface controllers (NICs) 1170, also known as network interface cards, which include physical network interface 1180. Each hardware device may also include non-transitory, persistent, machine-readable storage media 1190-2 having stored therein software 1195 and/or instructions executable by processing circuitry 1160. Software 1195 may include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and may be run by a corresponding virtualization layer 1150 or hypervisor. Different embodiments of the instance of virtual appliance 1120 may be implemented on one or more of virtual machines 1140, and the implementations may be made in different ways.

During operation, processing circuitry 1160 executes software 1195 to instantiate the hypervisor or virtualization layer 1150, which may sometimes be referred to as a virtual machine monitor (VMM). Virtualization layer 1150 may present a virtual operating platform that appears like networking hardware to virtual machine 1140.

As shown in FIG. 11, hardware 1130 may be a standalone network node with generic or specific components. Hardware 1130 may comprise antenna 11225 and may implement some functions via virtualization. Alternatively, hardware 1130 may be part of a larger cluster of hardware (e.g. such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1140 may be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 11.

In some embodiments, one or more radio units 11200 that each include one or more transmitters 11220 and one or more receivers 11210 may be coupled to one or more antennas 11225. Radio units 11200 may communicate directly with hardware nodes 1130 via one or more appropriate network interfaces and may be used in combination with the virtual components to provide a virtual node with radio capabilities, such as a radio access node or a base station.

In some embodiments, some signaling can be effected with the use of control system 11230 which may alternatively be used for communication between the hardware nodes 1130 and radio units 11200.

Figure 12:
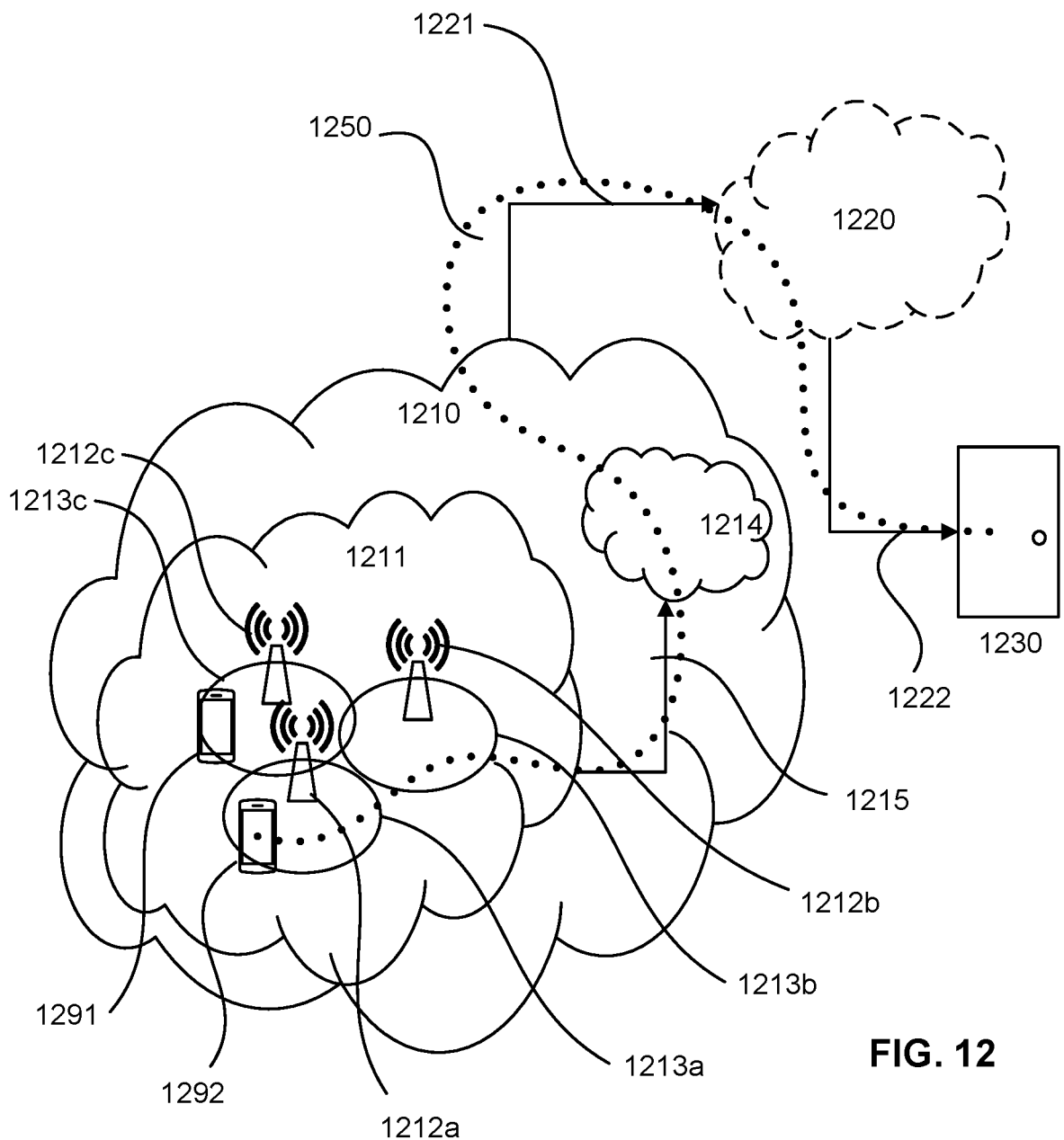
FIG. 12 is a block diagram of a telecommunication network connected via an intermediate network to a host computer in accordance with some embodiments.

FIG. 12 illustrates a telecommunication network connected via an intermediate network to a host computer in accordance with some embodiments.

With reference to FIG. 12, in accordance with an embodiment, a communication system includes telecommunication network 1210, such as a 3GPP-type cellular network, which comprises access network 1211, such as a radio access network, and core network 1214. Access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to core network 1214 over a wired or wireless connection 1215. A first UE 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Figure 13:
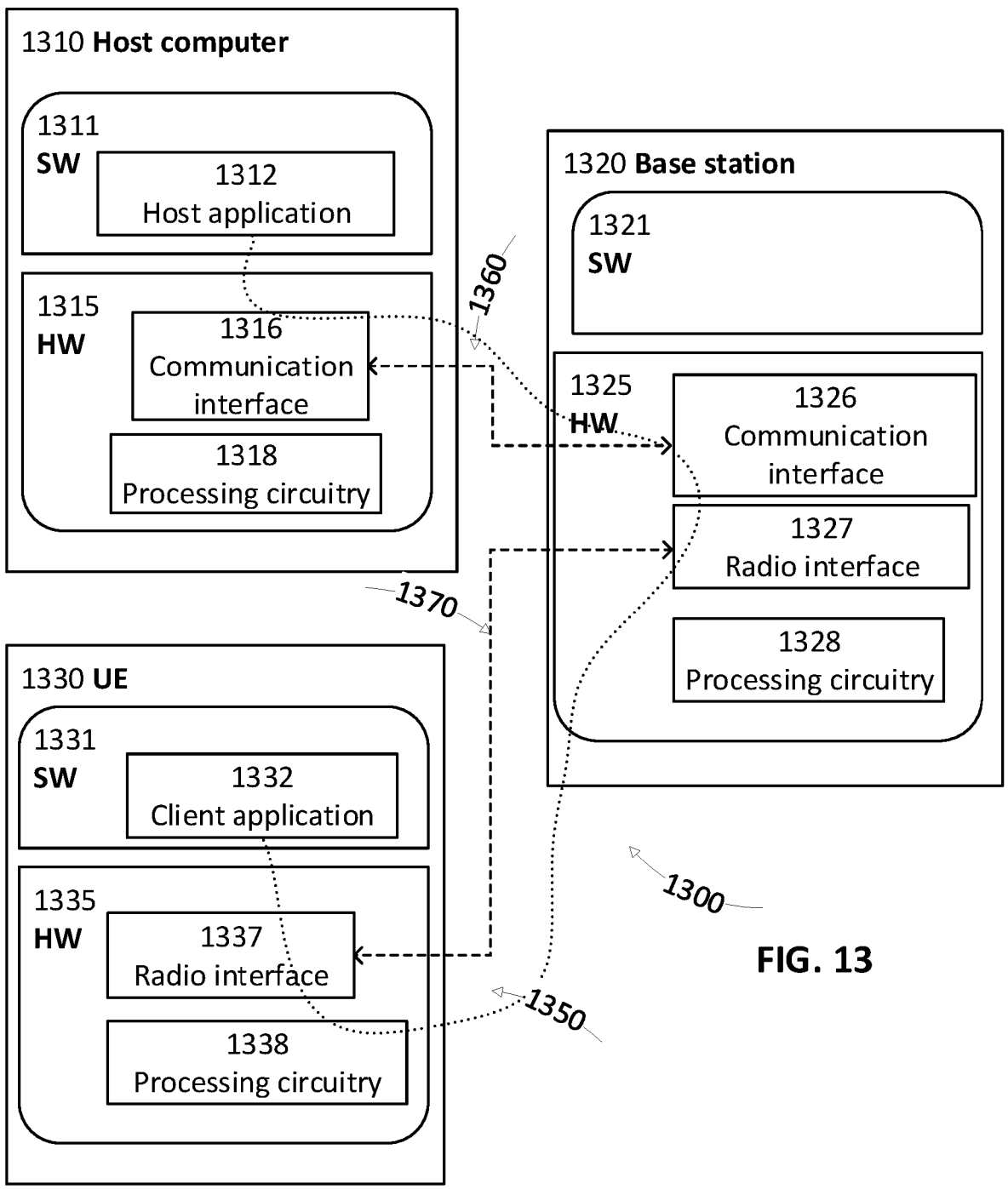
FIG. 13 is a block diagram of a host computer communicating via a base station with a user equipment over a partially wireless connection in accordance with some embodiments.

FIG. 13 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 13. In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

It is noted that host computer 1310, base station 1320 and UE 1330 illustrated in FIG. 13 may be similar or identical to host computer 1230, one of base stations 1212*a*, 1212*b*, 1212*c* and one of UEs 1291, 1292 of FIG. 12, respectively. This is to say, the inner workings of these entities may be as shown in FIG. 13 and independently, the surrounding network topology may be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments may improve the performance of OTT services provided to UE 1330 using OTT connection 1350, in which wireless connection 1370 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figure 14:
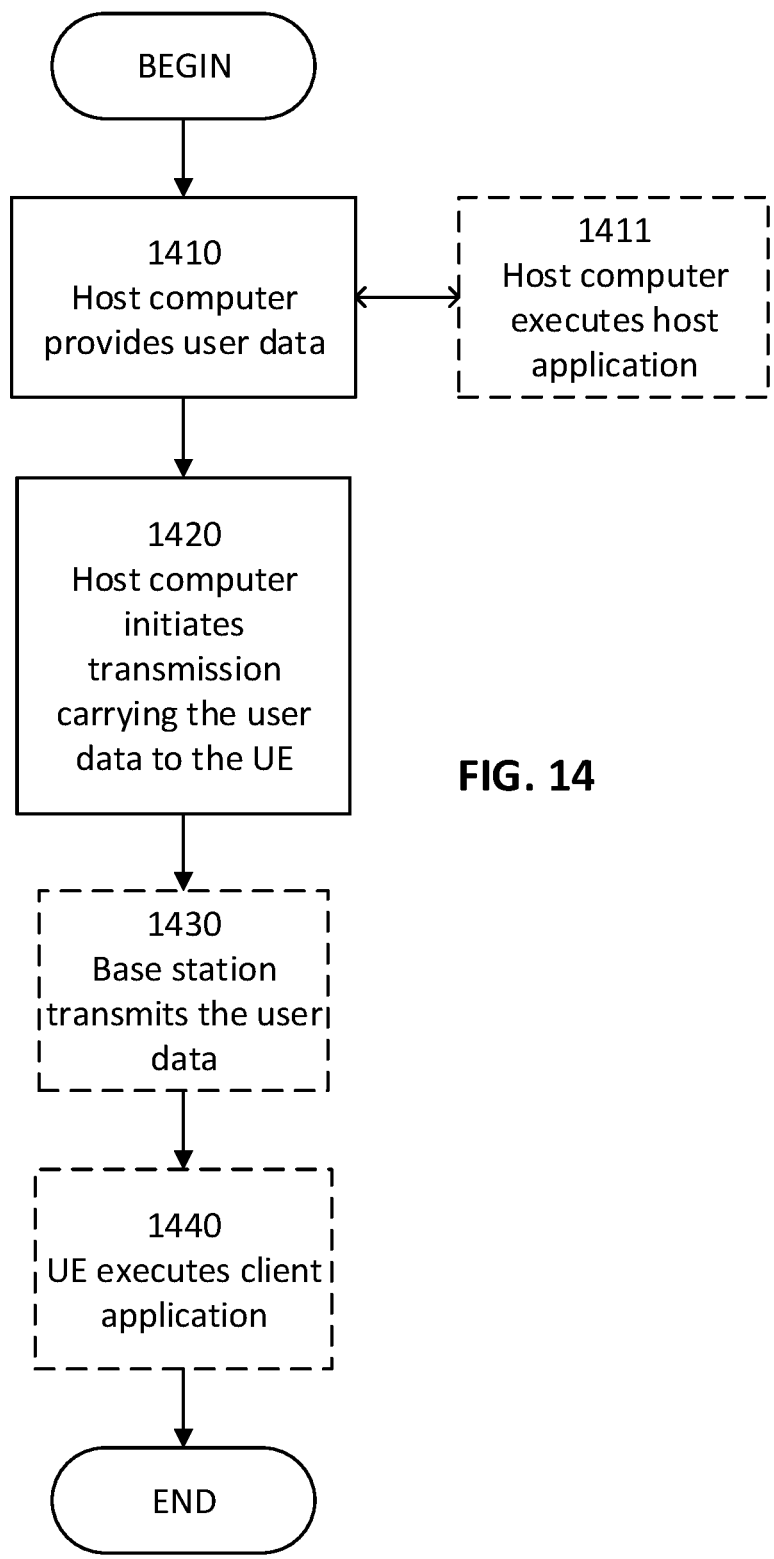
FIG. 14 is a block diagram of methods implemented in a communication system including a host computer, a base station and a user equipment in accordance with some embodiments.

FIG. 14 illustrates methods implemented in a communication system including a host computer, a base station and a user equipment in accordance with some embodiments FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

Figure 15:
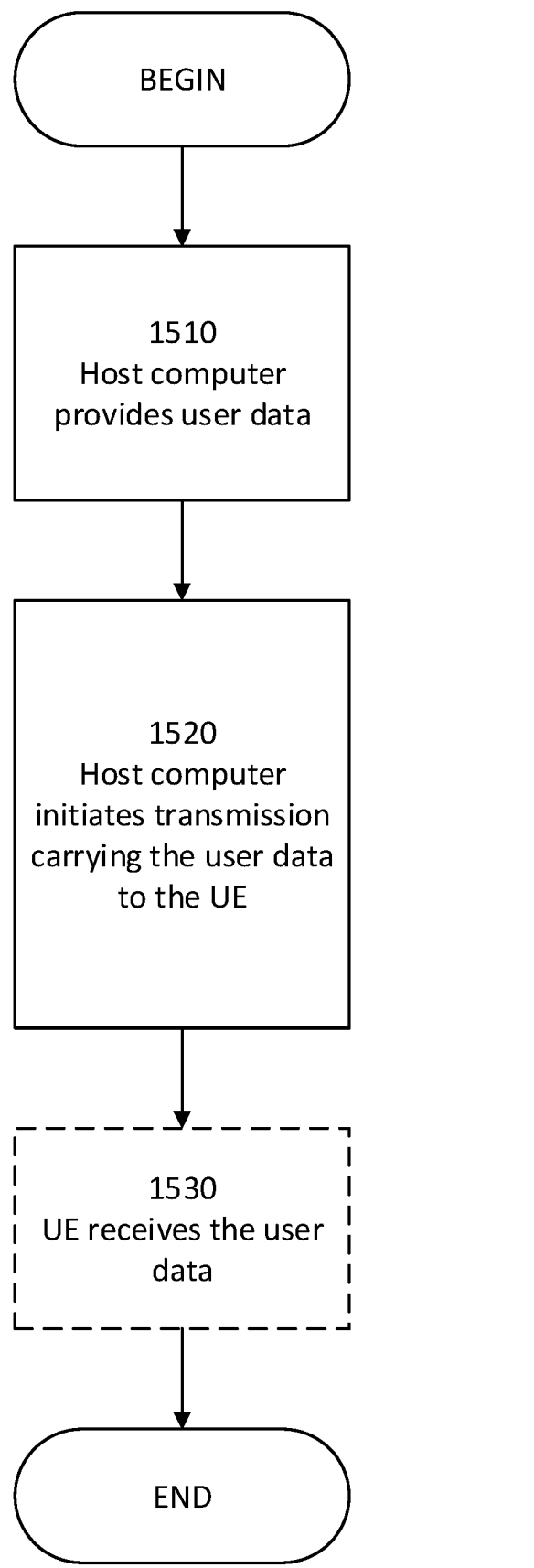
FIG. 15 is a block diagram of methods implemented in a communication system including a host computer, a base station and a user equipment in accordance with some embodiments.

FIG. 15 illustrates methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figure 16:
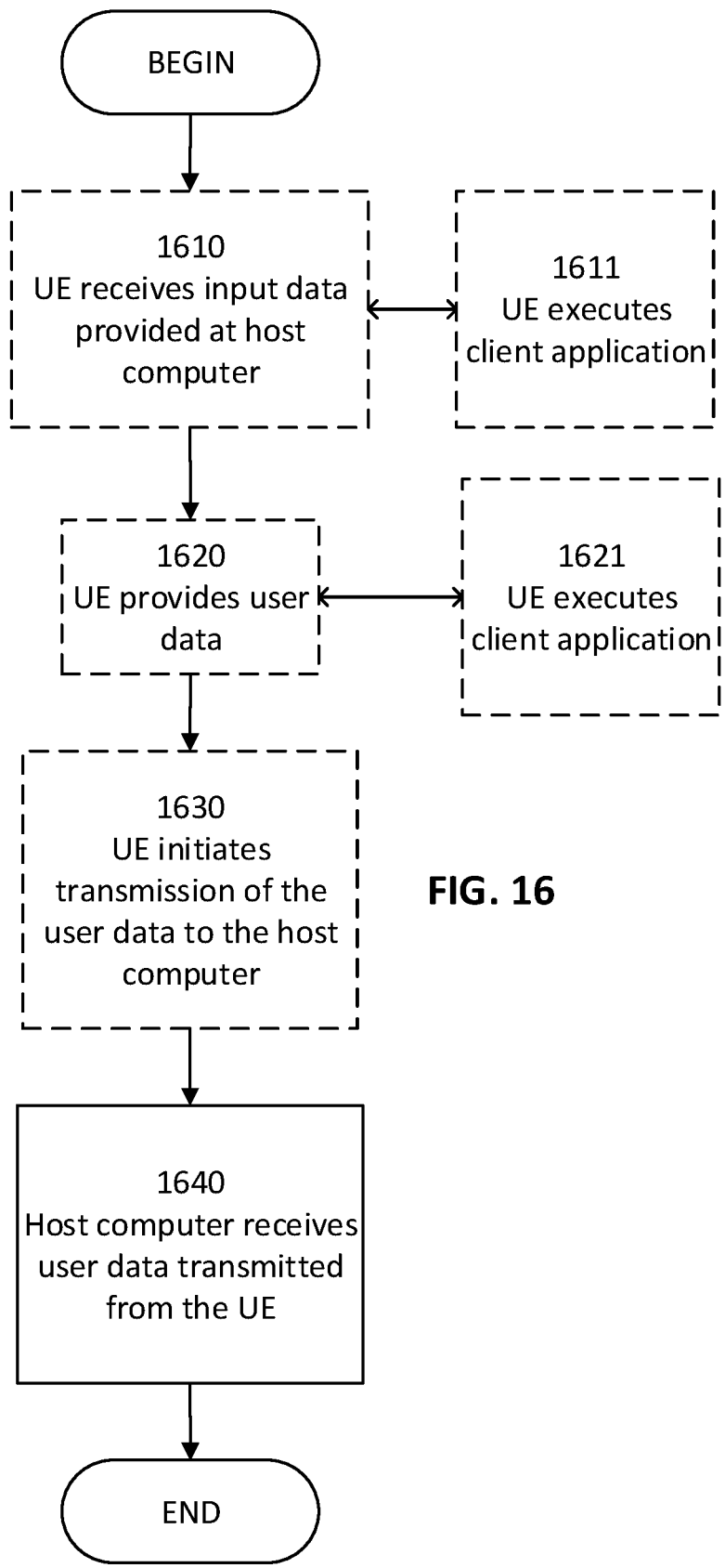
FIG. 16 is a block diagram of methods implemented in a communication system including a host computer, a base station and a user equipment in accordance with some embodiments.

FIG. 16 illustrates methods implemented in a communication system including a host computer, a base station and a user equipment in accordance with some embodiments FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

Figure 17:
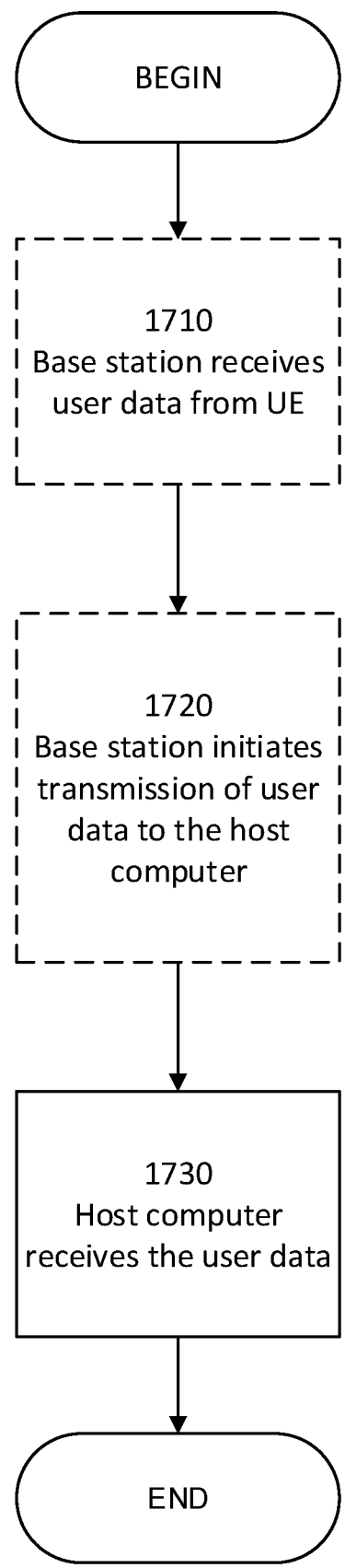
FIG. 17 is a block diagram of methods implemented in a communication system including a host computer, a base station and a user equipment in accordance with some embodiments.

FIG. 17 illustrates methods implemented in a communication system including a host computer, a base station and a user equipment in accordance with some embodiments FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1×Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a core access and mobility management function (AMF) node configured to operate in a communications network, comprising:
   receiving a protocol data unit (PDU) session request from user equipment (UE), the PDU session request including a requested data network name (DNN);
   determining if a trigger has been activated, wherein the trigger comprises at least one of a generic DNN manipulation trigger and a UE unique manipulation trigger; and
   receiving a manipulated DNN or replacement DNN for the requested DNN in response to the trigger being activated.

2. The method of claim 1, further comprising:
   comparing the requested DNN to subscriber information; and
   determining if there is a match between the requested DNN and the subscriber information.

3. The method of claim 2, further comprising:
   transmitting a message and the requested DNN and optionally other relevant information e.g. UE location, UE network capability to a policy control function (PCF) node to replace the requested DNN with the replacement DNN in response to the requested DNN not matching the subscriber information and the trigger being activated; and
   receiving the replacement DNN from the PCF node.

4. The method of claim 3, further comprising:
   transmitting the replacement DNN to a network repository function (NRF) node for selection of a session management function (SMF) node; and
   establishing a PDU session with a selected SMF node.

5. The method of claim 2, further comprising transmitting the requested DNN to a PCF node for manipulation or negotiation of the requested DNN in response to the requested DNN matching the subscriber information and the trigger being activated.

6. The method of claim 5, wherein manipulating the requested DNN comprises adding information to the requested DNN.

7. The method of claim 6, wherein adding the information to the requested DNN comprises adding at least one of a mobile station international directory number (MSISDN), a geographic location of the UE, a permanent equipment identifier (PEI), a subscriber permanent identifier (SUPI), or UE network capability to the requested DNN.

8. The method of claim 1, further comprising:
   initiating a peer-to-peer relationship with a policy control function (PCF) node; and
   subscribing to the set of generic DNN manipulation triggers.

9. The method of claim 1, wherein the set of UE unique manipulation triggers are based on one or more characteristics of a particular UE, wherein the one or more characteristics comprise the MSISDN of the particular UE, the location of the particular UE, and the requested DNN.

10. The method of claim 9, further comprising:
    receiving an initial registration from the particular UE;
    establishing an association between the particular UE and a policy control function (PCF) node; and
    receiving the set of UE unique DNN manipulation triggers from the PCF node, wherein certain data is provided to the PCF node in response to one of the UE unique DNN manipulation triggers being activated, the certain data being used by the PCF node to make decisions during establishment of a PDU session.

11. The method of claim 1, further comprising:
    storing the set of generic DNN manipulation triggers and the set of UE unique triggers separately; and
    determining activation of the triggers during establishment of each PDU session before selection of a session management function (SMF) node.

12. A core access and mobility management (AMF) node configured to operate in a communication network, wherein the AMF node is adapted to perform according to claim 1.

13. A method of operating a policy control function (PCF) node configured to operate in a communications network, the method comprising:
    receiving a message from an AMF node in response to activation of a trigger, the message including a requested DNN and optionally other relevant information including UE location and/or UE network capability, wherein the requested DNN is included in a PDU session request received by the AMF node from a UE, wherein the trigger comprises at least one of a generic DNN manipulation trigger and a UE unique manipulation trigger;
    performing a manipulation or replacing the requested DNN with a manipulated DNN or a replacement DNN; and
    transmitting the manipulated DNN or the replacement DNN to the AMF node.

14. The method of claim 13, wherein manipulating the requested DNN comprises adding information to the requested DNN.

15. The method of claim 14, wherein adding the information to the requested DNN comprises adding at least one of a mobile station international directory number (MSISDN), a geographic location of the UE, a permanent equipment identifier (PEI), a subscriber permanent identifier (SUPI), or UE network capability to the requested DNN.

16. The method of claim 13, further comprising:
    entering into a peer-to-peer relationship initiated by the AMF node; and
    providing a subscription to the set of generic DNN manipulation triggers.

17. The method of claim 13, further comprising:
    establishing an association with a particular UE in response to initial registration from the particular UE with the AMF node; and
    transmitting the set of UE unique DNN manipulation triggers to the AMF node.

18. A policy control function (PCF) node configured to operate in a communication network, wherein the PCF node is adapted to perform according to claim 13.

* * * * *